US010438082B1

United States Patent
Kim et al.

(10) Patent No.: US 10,438,082 B1
(45) Date of Patent: Oct. 8, 2019

(54) LEARNING METHOD, LEARNING DEVICE FOR DETECTING ROI ON THE BASIS OF BOTTOM LINES OF OBSTACLES AND TESTING METHOD, TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/171,645

(22) Filed: Oct. 26, 2018

(51) Int. Cl.
G06K 9/00 (2006.01)
G06K 9/32 (2006.01)
(Continued)

(52) U.S. Cl.
CPC ....... *G06K 9/3233* (2013.01); *G06K 9/00791* (2013.01); *G06K 9/00805* (2013.01);
(Continued)

(58) Field of Classification Search
CPC ........... G06K 9/00624; G06K 9/00664; G06K 9/00785; G06K 9/00791; G06K 9/00798;
(Continued)

(56) References Cited

U.S. PATENT DOCUMENTS 9,202,144 B2 * 12/2015 Wang ...................... G06K 9/66
10,223,610 B1 * 3/2019 Akselrod-Ballin ..........................
G06K 9/6218
(Continued)

OTHER PUBLICATIONS

Ross Girshick, "Fast R-CNN", IEEE, International Conference on Computer Vision, 2015, pp. 1440-1448. (Year: 2015).*
(Continued)

*Primary Examiner* — Eric Rush
(74) *Attorney, Agent, or Firm* — Xsensus LLP

(57) ABSTRACT

A method for learning parameters of a CNN capable of detecting ROIs determined based on bottom lines of nearest obstacles in an input image is provided. The method includes steps of: a learning device instructing a first to an n-th convolutional layers to generate a first to an n-th encoded feature maps from the input image; instructing an n-th to a first deconvolutional layers to generate an n-th to a first decoded feature maps from the n-th encoded feature map; if a specific decoded feature map is divided into directions of rows and columns, generating an obstacle segmentation result by referring to a feature of the n-th to the first decoded feature maps; instructing an RPN to generate an ROI bounding box by referring to each anchor box, and losses by referring to the ROI bounding box and its corresponding GT; and backpropagating the losses, to learn the parameters.

24 Claims, 12 Drawing Sheets
(3 of 12 Drawing Sheet(s) Filed in Color)

(51) Int. Cl.
*G06N 5/04* (2006.01)
*G06N 3/08* (2006.01)
*G06K 9/34* (2006.01)
*G06K 9/20* (2006.01)
*G06T 7/70* (2017.01)
*G06K 9/62* (2006.01)
*G06N 20/00* (2019.01)
*G06N 3/04* (2006.01)

(52) U.S. Cl.
CPC ......... *G06K 9/2054* (2013.01); *G06K 9/3241* (2013.01); *G06K 9/34* (2013.01); *G06K 9/62* (2013.01); *G06N 3/0454* (2013.01); *G06N 3/084* (2013.01); *G06N 5/046* (2013.01); *G06N 20/00* (2019.01); *G06T 7/70* (2017.01); *G06T 2207/20081* (2013.01); *G06T 2207/20084* (2013.01)

(58) Field of Classification Search
CPC ........... G06K 9/00805; G06K 9/00825; G06K 9/2054; G06K 9/3233; G06K 9/3241; G06K 9/34; G06K 9/46; G06K 9/4604; G06K 9/48; G06K 9/62; G06N 3/0454; G06N 3/08; G06N 3/084; G06N 5/046; G06N 20/00; G06N 20/10; G06N 20/20; G06T 7/10; G06T 7/11; G06T 7/12; G06T 7/70; G06T 7/73; G06T 7/74; G06T 2207/20021; G06T 2207/20081; G06T 2207/20084; G06T 2207/20112
USPC ....... 382/100, 103, 104, 153–159, 173, 174, 382/181, 199
See application file for complete search history.

(56) References Cited

U.S. PATENT DOCUMENTS

| | | | |
|---|---|---|---|
| 2006/0245653 A1* | 11/2006 | Camus | G06K 9/3241 382/199 |
| 2017/0011281 A1* | 1/2017 | Dijkman | G06K 9/66 |
| 2017/0132472 A1* | 5/2017 | Tao | G06K 9/00758 |
| 2017/0206431 A1* | 7/2017 | Sun | G06K 9/4671 |
| 2017/0220876 A1* | 8/2017 | Gao | G06K 9/00805 |
| 2017/0294124 A1* | 10/2017 | Baba | G06K 9/00805 |
| 2018/0129887 A1* | 5/2018 | Kang | G06K 9/00798 |
| 2018/0137642 A1* | 5/2018 | Malisiewicz | G06K 9/66 |
| 2018/0158189 A1* | 6/2018 | Yedla | G06K 9/627 |
| 2018/0165551 A1* | 6/2018 | Roh | G06N 3/0454 |
| 2018/0253622 A1* | 9/2018 | Chen | G06K 9/4671 |
| 2019/0102646 A1* | 4/2019 | Redmon | G06K 9/4619 |

OTHER PUBLICATIONS

Shaoqing Ren, Kaiming He, Ross Girshick, and Jian Sun, "Faster R-CNN: Towards Real-Time Object Detection with Region Proposal Networks", IEEE Transactions on Pattern Analysis and Machine Intelligence, vol. 39, No. 6, Jun. 2017, pp. 1137-1149. (Year: 2017).*

Abhinav Shrivastava and Abhinav Gupta, "Contextual Priming and Feedback for Faster R-CNN", European Conference on Computer Vision, Lecture Notes in Computer Science, vol. 9905, 2016, pp. 1-19. (Year: 2016).*

* cited by examiner

FIG. 5
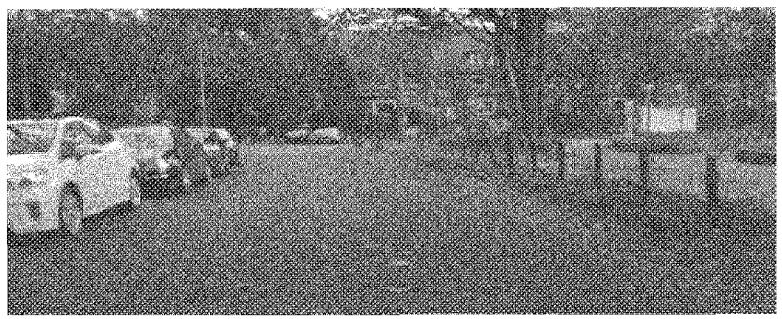
INPUT IMAGE
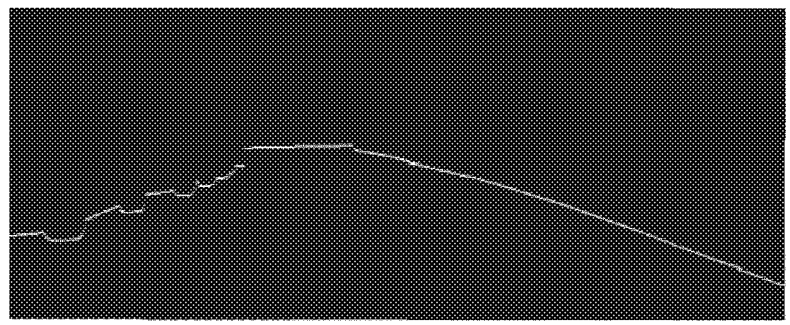
GROUND TRUTH (GT)

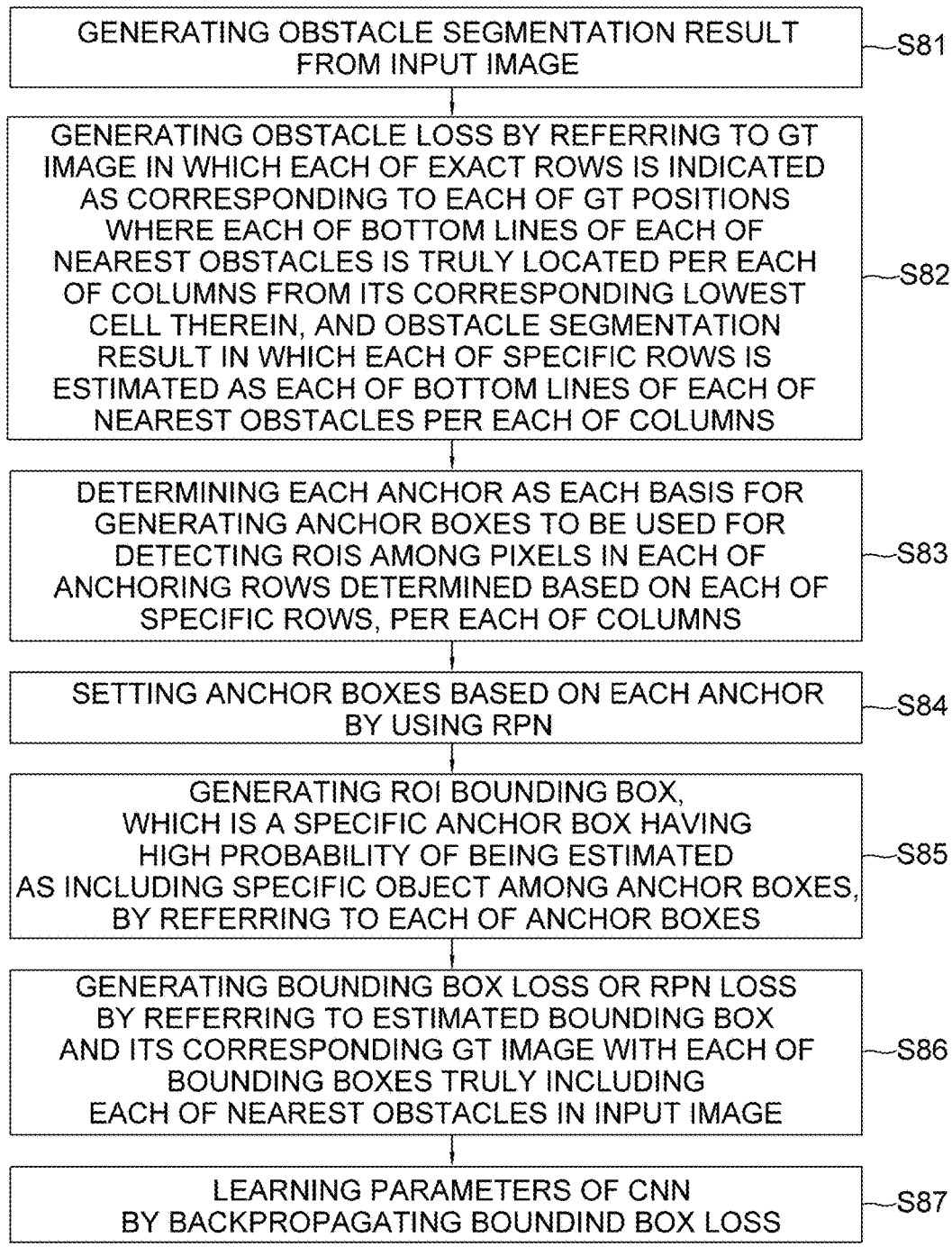

SETTING ANCHOR AND ANCHOR BOXES

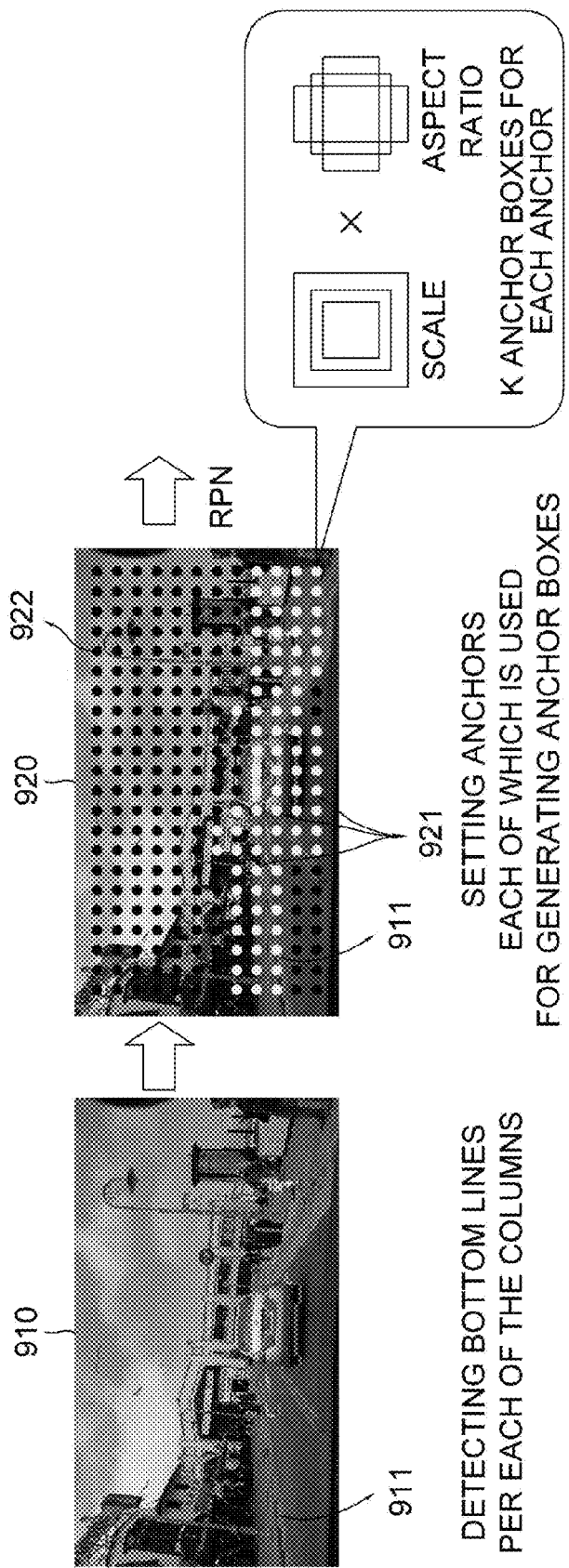

US 10,438,082 B1

LEARNING METHOD, LEARNING DEVICE FOR DETECTING ROI ON THE BASIS OF BOTTOM LINES OF OBSTACLES AND TESTING METHOD, TESTING DEVICE USING THE SAME

FIELD OF THE INVENTION

The present invention relates to a method for learning parameters of a CNN capable of detecting one or more ROIs determined based on one or more bottom lines of one or more nearest obstacles in at least one input image; and more particularly, to the method for learning the parameters of the CNN capable of detecting the ROIs determined based on the bottom lines of the nearest obstacles in the input image, including steps of: (a) instructing a first convolutional layer to an n-th convolutional layer to respectively and sequentially generate a first encoded feature map to an n-th encoded feature map from the input image; (b) instructing an n-th deconvolutional layer to a first deconvolutional layer to sequentially generate an n-th decoded feature map to a first decoded feature map from the n-th encoded feature map; (c) supposing that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the specific decoded feature map and the second direction is in a direction of the columns thereof, generating at least one obstacle segmentation result representing each of specific rows, where each of the bottom lines of each of the nearest obstacles is estimated as being located per each of the columns, by referring to at least one feature of at least part of the n-th decoded feature map to the first decoded feature map; (d) determining each anchor as each basis for generating anchor boxes to be used for detecting each of the ROIs, among pixels in each of anchoring rows estimated on basis of each of the specific rows, per each of the columns; (e) instructing an RPN to generate (i) at least one ROI bounding box by referring to each of the anchor boxes wherein at least one of the anchor boxes is estimated on basis of said each anchor, and (ii) one or more first losses by referring to the ROI bounding box and its corresponding at least one first GT, wherein the ROI bounding box is a specific anchor box, having a high probability of being estimated as including a specific object, among the anchor boxes and wherein the first GT represents a bounding box truly including the specific object in the input image; and (f) backpropagating the first losses, to thereby learn the parameters of the CNN, and a learning device, a testing method, and a testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 is a drawing schematically illustrating a conventional process of a general segmentation by using a conventional CNN.

By referring to FIG. 1, according to the conventional lane detection method, a learning device receives an input image, generates feature maps by multiple convolution operations and non-linear operations like ReLU in multiple convolutional layers, and generates a segmentation result by performing multiple deconvolution operations in multiple deconvolutional layers and SoftMax operations on a last of the feature maps.

On the other hand, a conventional method of a lane segmentation has to segment every pixel in the input image, and check every pixel to determine whether the pixel corresponds to a lane or not. Such the conventional method requires a tremendous amount of computation caused by checking every pixel, which is clearly a problem.

Meanwhile, when performing the lane segmentation for autonomous vehicles, there is no need for segmentation of all objects within the input image, but detecting only obstacles to the autonomous vehicles should suffice.

Thus a new method for detecting only the obstacles within the input image is required.

Also, the new method is required to find bounding boxes of the objects with less computation of an RPN (Region Proposal Network).

SUMMARY OF THE INVENTION

It is an object of the present invention to solve all the aforementioned problems.

It is another object of the present invention to provide a new method for detecting nearest obstacles while autonomous vehicles are running.

It is still another object of the present invention to provide a method for finding bounding boxes with ease by fast detection of locations of the nearest obstacles with less computation, without checking every pixel in an input image.

It is still yet another object of the present invention to provide a method for reducing computational load of an RPN (Region Proposal Network).

In accordance with one aspect of the present invention, there is provided a method for learning parameters of a CNN capable of detecting one or more ROIs determined based on one or more bottom lines of one or more nearest obstacles in at least one input image, including steps of: (a) a learning device instructing a first convolutional layer to an n-th convolutional layer to respectively and sequentially generate a first encoded feature map to an n-th encoded feature map from the input image; (b) the learning device instructing an n-th deconvolutional layer to a first deconvolutional layer to sequentially generate an n-th decoded feature map to a first decoded feature map from the n-th encoded feature map; (c) the learning device, supposing that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the specific decoded feature map and the second direction is in a direction of the columns thereof, generating at least one obstacle segmentation result representing each of specific rows, where each of the bottom lines of each of the nearest obstacles is estimated as being located per each of the columns, by referring to at least one feature of at least part of the n-th decoded feature map to the first decoded feature map; (d) the learning device, determining each anchor as each basis for generating anchor to boxes to be used for detecting each of the ROIs, among pixels in each of anchoring rows estimated on basis of each of the specific rows, per each of the columns; (e) the learning device instructing an RPN to generate (i) at least one ROI bounding box by referring to each of the anchor boxes wherein at least one of the anchor boxes is estimated on basis of said each anchor, and (ii) one or more first losses by referring to the ROI bounding box and its corresponding at least one first GT, wherein the ROI bounding box is a specific anchor box, having a high probability of being estimated as including a specific object, among the anchor boxes and wherein the first GT represents a bounding box truly including the specific object in the input image; and (f) the learning device backpropagating the first losses, to thereby learn the parameters of the CNN.

As one example, the step of (c) includes steps of: (c1) the learning device, supposing that each cell of the grid has been generated by dividing the at least one decoded feature map with respect to the first direction by first intervals and with respect to the second direction by second intervals, concatenating each of features of each of the rows per each of the columns in a direction of a channel, to thereby generate at least one reshaped feature map; and (c2) the learning device generating the obstacle segmentation result which represents where each of the bottom lines of each of the nearest obstacles is estimated as located among the rows for each of the columns by referring to the reshaped feature map via checking each of estimated positions of each of the bottom lines of each of the nearest obstacles on concatenated channels for each of the columns, wherein the obstacle segmentation result is generated by a softmax operation which normalizes each value corresponding to each channel per each of the columns.

As one example, the step of (c) includes a step of: (c3) the learning device generating one or more second losses by referring to (i) each location of exact rows where each of the bottom lines of each of the nearest obstacles is truly positioned per each of the columns on at least one second GT image, for each of the columns, and (ii) each location of the specific rows, where each of the bottom lines of each of the nearest obstacles is estimated as being positioned per each of the columns, on the obstacle segmentation result; and at the step of (f), the first losses and the second losses are backpropagated, to thereby learn the parameters of the CNN.

As one example, at the step of (e), multiple different anchor boxes are set for said each anchor by referring to at least one of (i) at least one scale and (ii) at least one aspect ratio, of at least one of the anchor boxes.

As one example, each of the columns includes one or more pixels in the first direction, and each of the rows includes one or more pixels in the second direction.

As one example, the first GT includes information on which row each of the bottom lines of each of the nearest obstacles is truly located among the rows, per each of the columns, on condition that the input image is divided into Nc rows, and wherein the obstacle segmentation result represents on which row each of the bottom lines of each of the nearest obstacles is estimated as located among the rows, per each of the columns, on condition that the input image is divided into the Nc rows.

As one example, at the step of (c), if each of the bottom lines of each of the nearest obstacles is estimated as present for each of the columns, the obstacle segmentation result is generated such that each of the estimated positions of the each of the bottom lines in each of the specific rows per each of the columns is allowed to have each corresponding highest value, and positions in other rows among the rows are allowed to have lower values, among the Nc rows.

In accordance with another aspect of the present invention, there is provided a method for testing a CNN capable of detecting one or more ROIs for testing based on one or more bottom lines of one or more nearest obstacles for testing in at least one test image, including steps of: (a) a testing device acquiring the test image, on condition that a learning device has performed processes of (1) instructing a first convolutional layer to an n-th convolutional layer to respectively and sequentially generate a first encoded feature map for training to an n-th encoded feature map for training from at least one training image, (2) instructing an n-th deconvolutional layer to a first deconvolutional layer to sequentially generate an n-th decoded feature map for training to a first decoded feature map for training from the n-th encoded feature map for training, (3) if each cell of a grid with a plurality of rows and a plurality of columns is generated by dividing at least one specific decoded feature map for training, among the n-th decoded feature map for training to the first decoded feature map for training, with respect to a first direction and a second direction, wherein the first direction is in a direction of the rows of the specific decoded feature map for training and the second direction is in a direction of the columns thereof, generating at least one obstacle segmentation result for training representing each of specific rows for training, where each of bottom lines of each of one or more nearest obstacles for training is estimated as being located per each of the columns, by referring to at least one feature of at least part at the n-th decoded feature map for training to the first decoded feature map for training, (4) determining each anchor for training as each basis for generating anchor boxes for training to be used for detecting each of the ROIs for training, among pixels in each of anchoring rows for training estimated on basis of each of the specific rows for training, per each of the columns, (5) instructing an RPN to generate (i) at least one ROI bounding box for training by referring to each of the anchor boxes for training wherein at least one of the anchor boxes for training is estimated on basis of said each anchor for training, and (ii) at least one first loss by referring to the ROI bounding box and its corresponding at least one first GT, wherein the ROI bounding box for training is a specific anchor box for training, having a high probability of being estimated as including a specific object for training, among the anchor boxes for training and wherein the first GT represents a bounding box for training truly including the specific object for training in the training image, and (6) backpropagating the first loss, to thereby learn parameters of the CNN; (b) the testing device instructing the first convolutional layer to the n-th convolutional layer to respectively and sequentially generate a first encoded feature map for testing to an n-th encoded feature map for testing from the test image; (c) the testing device instructing the n-th deconvolutional layer to the first deconvolutional layer to sequentially generate an n-th decoded feature map for testing to a first decoded feature map for testing from the n-th encoded feature map for testing; (d) the testing device, supposing that each cell of a grid with a plurality of rows and a plurality of columns is generated by dividing at least one specific decoded feature map for testing, among the n-th decoded feature map for testing to the first decoded feature map for testing, with respect to a first direction and a second direction, wherein the first direction is in a direction of the rows of the specific decoded feature map for testing and the second direction is in a direction of the columns thereof, generating at least one obstacle segmentation result for testing representing each of specific rows for testing, where each of the bottom lines of each of the nearest obstacles for testing is estimated as being located per each of the columns, by referring to at least one feature of at least part of the n-th decoded feature map for testing to the first decoded feature map for testing; (e) the testing device determining each anchor for testing as each basis for generating anchor boxes for testing to be used for detecting each of the ROIs for testing, among pixels in each of anchoring rows for testing estimated on basis of each of the specific rows for testing, per each of the columns; and (f) the testing device instructing the RPN to generate at least one ROI bounding box for testing by referring to each of the anchor boxes for testing wherein at least one of the anchor boxes for testing is estimated on basis of said each anchor for testing.

As one example, the step of (d) includes steps of: (d1) the testing device, supposing that each cell of the grid has been generated by dividing the at least one decoded feature map for testing with respect to the first direction by first intervals and with respect to the second direction by second intervals, concatenating each of features for testing of each of the rows per each of the columns in a direction of a channel, to thereby generate at least one reshaped feature map for testing; and (d2) the testing device generating the obstacle segmentation result for testing which represents where each of the bottom lines of each of the nearest obstacles for testing is estimated as located among the rows for each of the columns by referring to the reshaped feature map for testing via checking each of estimated positions of each of the bottom lines of each of the nearest obstacles for testing on concatenated channels for each of the columns, wherein the obstacle segmentation result for testing is generated by a softmax operation which normalizes each value corresponding to each channel per each of the columns.

As one example, at the step of (f), multiple different anchor boxes for testing are set for said each anchor for testing by referring to at least one of (i) at least one scale and (ii) at least one aspect ratio, of at least one of the anchor boxes for testing.

As one example, each of the columns includes one or more pixels in the first direction, and each of the rows includes one or more pixels in the second direction.

As one example, the first GT includes information on which row each of the bottom lines of each of the nearest obstacles for testing is truly located among the rows, per each of the columns, on condition that the test image is divided into Nc rows, and wherein the obstacle segmentation result for testing represents on which row each of the bottom lines of each of the nearest obstacles for testing is estimated as located among the rows, per each of the columns, on condition that the test image is divided into the Nc rows, wherein, at the step of (d), if each of the bottom lines of each of the nearest obstacles for testing is estimated as present for each of the columns, the obstacle segmentation result for testing is generated such that each of the estimated positions of the each of the bottom lines in each of the specific rows for testing per each of the columns is allowed to have each corresponding highest value, and positions in other rows among the rows are allowed to have lower values, among the Nc rows.

In accordance with still another aspect of the present invention, there is provided a A learning device for learning parameters of a CNN capable of detecting one or more ROIs determined based on one or more bottom lines of one or more nearest obstacles in at least one input image, including: a communication part for acquiring the input image; and a processor for performing processes of (I) instructing a first convolutional layer to an n-th convolutional layer to respectively and sequentially generate a first encoded feature map to an n-th encoded feature map from the input image, (II) instructing an n-th deconvolutional layer to a first deconvolutional layer to sequentially generate an n-th decoded feature map to a first decoded feature map from the n-th encoded feature map, (III) if each cell of a grid with a plurality of rows and a plurality of columns is generated by dividing at least one specific decoded feature map, among the n-th decoded feature map to the first decoded feature map, with respect to first direction and a second direction, wherein the first direction is in a direction of the rows of the specific decoded feature map and the second direction is in a direction of the columns thereof, generating at least one obstacle segmentation result representing each of specific rows, where each of the bottom lines of each of the nearest obstacles is estimated as being located per each of the columns, by referring to at least one feature of at least part of the n-th decoded feature map to the first decoded feature map, (IV) determining each anchor as each basis for generating anchor boxes to be used for detecting each of the ROIs, among pixels in each of anchoring rows estimated on basis of each of the specific rows, per each of the columns, (V) instructing an RPN to generate (i) at least one ROI bounding box by referring to each of the anchor boxes wherein at least one of the anchor boxes is estimated on basis of said each anchor, and (ii) one or more first losses by referring to the ROI bounding box and its corresponding at least one first GT, wherein the ROI bounding box is a specific anchor box, having a high probability of being estimated as including a specific object, among the anchor boxes and wherein the first GT represents a bounding box truly including the specific object in the input image, and (VI) backpropagating the first losses, to thereby learn the parameters of the CNN.

As one example, the process of (III) includes processes of: (III-1) if each cell of the grid has been generated by dividing the at least one decoded feature map with respect to the first direction by first intervals and with respect to the second direction by second intervals, concatenating each of features of each of the rows per each of the columns in a direction of a channel, to thereby generate at least one reshaped feature map; and (III-2) generating the obstacle segmentation result which represents where each of the bottom lines of each of the nearest obstacles is estimated as located among the rows for each of the columns by referring to the reshaped feature map via checking each of estimated positions of each of the bottom lines of each of the nearest obstacles on concatenated channels for each of the columns, wherein the obstacle segmentation result is generated by a softmax operation which normalizes each value corresponding to each channel per each of the columns.

As one example, the process of (III) includes a process of: (III-3) generating one or more second losses by referring to (i) each location of exact rows where each of the bottom lines of each of the nearest obstacles is truly positioned per each of the columns on at least one second GT image, for each of the columns, and (ii) each location of the specific rows, where each of the bottom lines of each of the nearest obstacles is estimated as being positioned per each of the columns, on the obstacle segmentation result; and at the process of (VI), the first losses and the second losses are backpropagated, to thereby learn the parameters of the CNN.

As one example, at the process of (V), multiple different anchor boxes are set for said each anchor by referring to at least one of (i) at least one scale and (ii) at least one aspect ratio, of at least one of the anchor boxes.

As one example, each of the columns includes one or more pixels in the first direction, and each of the rows includes one or more pixels in the second direction.

As one example, the first GT includes information on which row each of the bottom lines of each of the nearest obstacles is truly located among the rows, per each of the columns, on condition that the input image is divided into Nc rows, and wherein the obstacle segmentation result represents on which row each of the bottom lines of each of the nearest obstacles is estimated as located among the rows, per each of the columns, on condition that the input image is divided into the Nc rows.

As one example, at the process of (III), if each of the bottom lines of each of the nearest obstacles is estimated as present for each of the columns, the obstacle segmentation result is generated such that each of the estimated positions of the each of the bottom lines in each of the specific rows per each of the columns is allowed to have each corresponding highest value, and positions in other rows among the rows are allowed to have lower values, among the Nc rows.

In accordance with still yet another aspect of the present invention, there is provided a testing device for testing by using a CNN capable of detecting one or more ROIs for testing based on one or more bottom lines of one or more nearest obstacles for testing in at least one test image, including: a communication part for acquiring the test image, on condition that a learning device has performed processes of (1) instructing a first convolutional layer to an n-th convolutional layer to respectively and sequentially generate a first encoded feature map for training to an n-th encoded feature map for training from at least one training image, (2) instructing an n-th deconvolutional layer to a first deconvolutional layer to sequentially generate an n-th decoded feature map for training to a first decoded feature map for training from the n-th encoded feature map for training, (3) if each cell of a grid with a plurality of rows and a plurality of columns is generated by dividing at least one specific decoded feature map for training, among the n-th decoded feature map for training to the first decoded feature map for training, with respect to a first direction and a second direction, wherein the first direction is in a direction of the rows of the specific decoded feature map for training and the second direction is in a direction of the columns thereof, generating at least one obstacle segmentation result for training representing each of specific rows for training, where each of bottom lines of each of one more nearest obstacles for training is estimated as being located per each of the columns, by referring to at least one feature of at least part of the n-th decoded feature map for training to the first decoded feature map for training, (4) determining each anchor for training as each basis for generating anchor boxes for training to be used for detecting each of the ROIs for training, among pixels in each of anchoring rows for training estimated on basis of each of the specific rows for training, per each of the columns, (5) instructing an RPN to generate (i) at least one ROI bounding box for training by referring to each of the anchor boxes for training wherein at least one of the anchor boxes for training is estimated on basis of said each anchor for training, and (ii) at least one first loss by referring to the ROI bounding box and its corresponding at least one first GT, wherein the ROI bounding box for training is a specific anchor box for training, having a high probability of being estimated as including a specific object for training, among the anchor boxes for training and wherein the first GT represents a bounding box for training truly including the specific object for training in the training image, and (6) backpropagating the first loss, to thereby learn parameters of the CNN; and a processor for performing processes of (I) instructing the first convolutional layer to the n-th convolutional layer to respectively and sequentially generate a first encoded feature map for testing to an n-th encoded feature map for testing from the test image, (II) instructing the n-th deconvolutional layer to the first deconvolutional layer to sequentially generate an n-th decoded feature map for testing to a first decoded feature map for testing from the n-th encoded feature map for testing, (III) if each cell of a grid with a plurality of rows and a plurality of columns is generated by dividing at least one specific decoded feature map for testing, among the n-th decoded feature map for testing to the first decoded feature map for testing, with respect to a first direction and a second direction, wherein the first direction is in a direction of the rows of the specific decoded feature map for testing and the second direction is in a direction of the columns thereof, generating at least one obstacle segmentation result for testing representing each of specific rows for testing, where each of the bottom lines of each of the nearest obstacles for testing is estimated as being located per each of the columns, by referring to at least one feature of at least part of the n-th decoded feature map for testing to the first decoded feature map for testing, (IV) determining each anchor for testing as each basis for generating anchor boxes for testing to be used for detecting each of the ROIs for testing, among pixels in each of anchoring rows for testing estimated on basis of each of the specific rows for testing, per each of the columns, and (V) instructing the RPN to generate at least one ROI bounding box for testing by referring to each of the anchor boxes for testing wherein at least one of the anchor boxes for testing is estimated on basis of said each anchor for testing.

As one example, the process of (III) includes processes of: (III-1) if each cell of the grid has been generated by dividing the at least one decoded feature map for testing with respect to the first direction by first intervals and with respect the second direction by second intervals, concatenating each of features for testing of each of the rows per each of the columns in a direction of a channel, to thereby generate at least one reshaped feature map for testing; and (III-2) generating the obstacle segmentation result for testing which represents where each of the bottom lines of each of the nearest obstacles for testing is estimated as located among the rows for each of the columns by referring to the reshaped feature map for testing via checking each of estimated positions of each of the bottom lines of each of the nearest obstacles for testing on concatenated channels for each of the columns, wherein the obstacle segmentation result for testing is generated by a softmax operation which normalizes each value corresponding to each channel per each of the columns.

As one example, at the process of (V), multiple different anchor boxes for testing are set for said each anchor for testing by referring to at least one of (i) at least one scale and (ii) at least one aspect ratio, of at least one of the anchor boxes for testing.

As one example, each of the columns includes one or more pixels in the first direction, and each of the rows includes one or more pixels in the second direction.

As one example, the first GT includes information on which row each of the bottom lines of each of the nearest obstacles for testing is truly located among the rows, per each of the columns, on condition that the test image is divided into Nc rows, and wherein the obstacle segmentation result for testing represents on which row each of the bottom lines of each of the nearest obstacles for testing is estimated as located among the rows, per each of the columns, on condition that the test image is divided into the Nc rows, wherein, at the process of (III), if each of the bottom lines of each of the nearest obstacles for testing is estimated as present for each of the columns, the obstacle segmentation result for testing is generated such that each of the estimated positions of the each of the bottom lines in each of the specific rows for testing per each of the columns is allowed to have each corresponding highest value, and positions in other rows among the rows are allowed to have lower values, among the Nc rows.

BRIEF DESCRIPTION OF THE DRAWINGS

The patent or application file contains at least one drawing executed in color. Copies of this patent or patent application publication with color drawing (s) will be provided by the Office upon request and payment of the necessary fee.

FIG. 5 is a drawing exemplary illustrating the input image and its corresponding GT image for detecting the nearest obstacles in accordance with the present invention.

FIG. 8 is a flow chart schematically illustrating a process of detecting one or more ROIs in accordance with the present invention.

FIG. 9B is a drawing schematically illustrating a process using the RPM in accordance with the present invention.

DETAILED DESCRIPTION OF THE PREFERRED EMBODIMENTS

Figure 1:
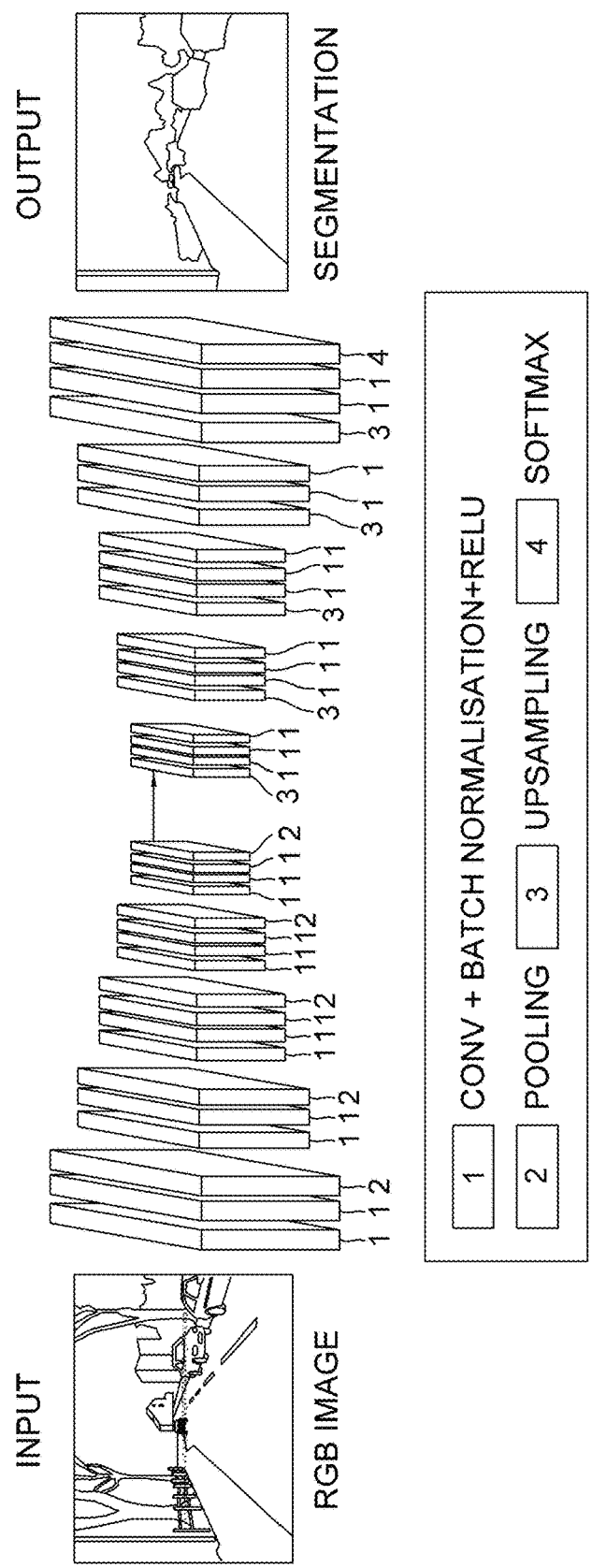
FIG. 1 is a drawing schematically illustrating a conventional process of a general segmentation by using a conventional CNN.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

The present invention provides an algorithm capable of detecting nearest obstacles fast with less computation in a high-resolution image. It is an object of detecting the nearest obstacles in accordance with the present invention to identify at least one boundary between a road and at least one obstacle in an input image. Supposing that a direction of rows of the input image is a first direction, and that the direction of columns of the input image is a second direction, the first direction may be divided by first intervals to form multiple columns, and the second direction may be divided by second intervals to form multiple rows, and thus a grid may be generated. Using information on specific rows for each of the columns where each nearest obstacle is estimated as located by checking each of the columns starting from its corresponding lowest cell of the grid along the second direction, locations of the nearest obstacles on a road may be detected. Also, the present invention reduces computational load by (i) a learning process with multi-loss using high-resolution information and (ii) a testing process using low-resolution features only.

Figure 2:
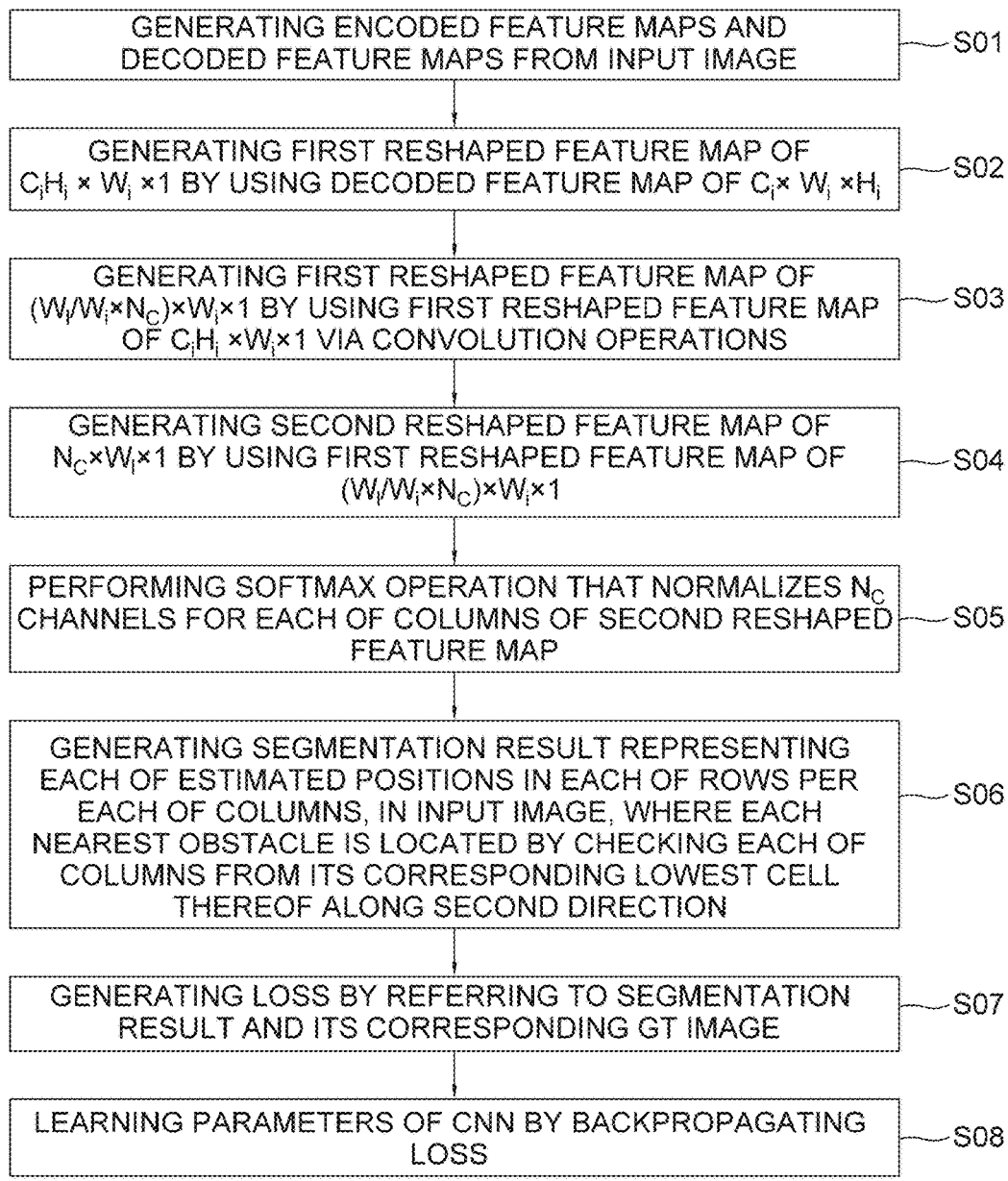
FIG. 2 is a flow chart schematically illustrating a learning method of a CNN for detecting nearest obstacles in accordance with the present invention.
Figure 3:
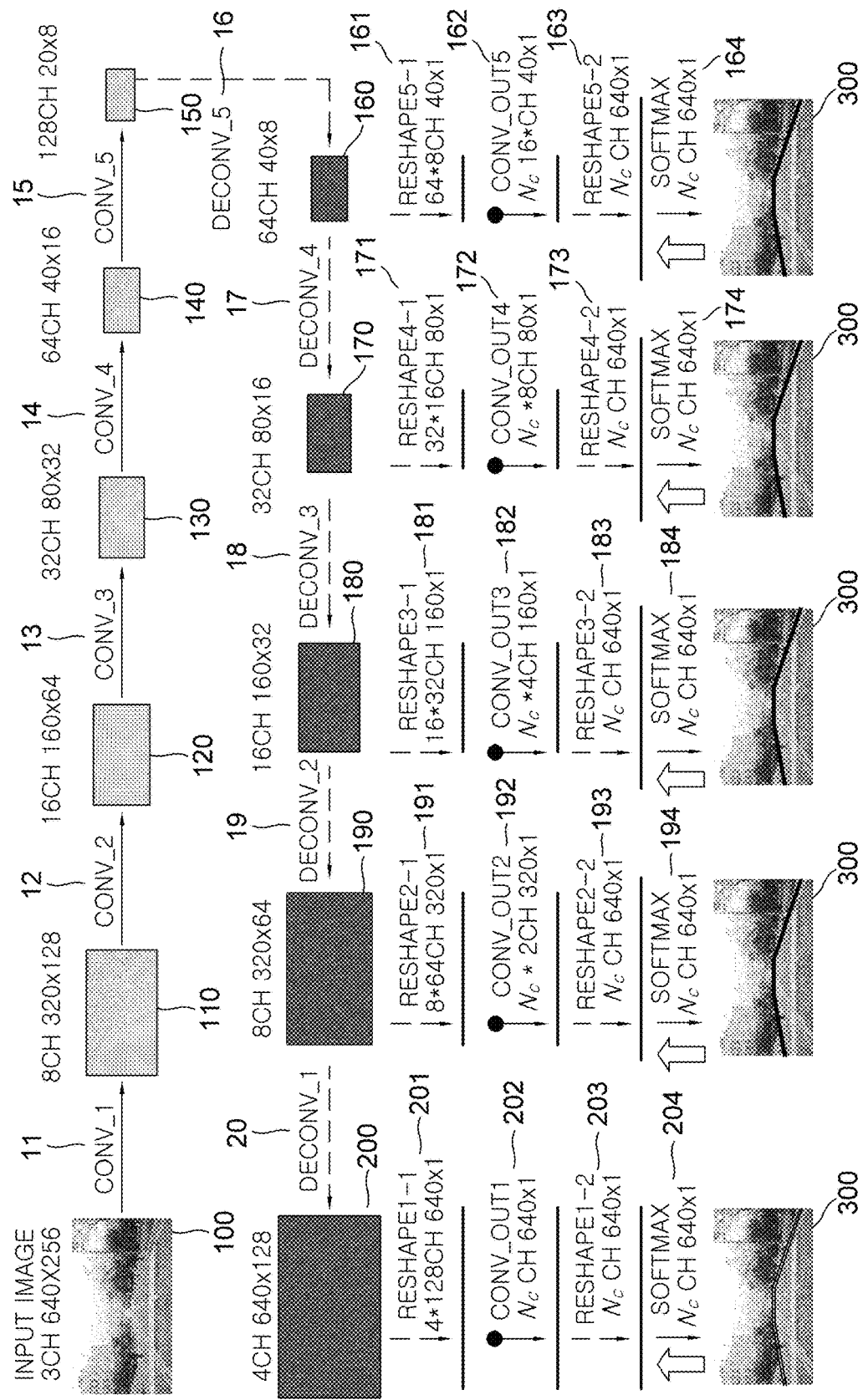
FIG. 3 is a drawing exemplary illustrating a process of operations on an input image to describe the learning method of the CNN for detecting the nearest obstacles in accordance with the present invention.

FIG. 2 is a flow chart schematically illustrating a learning method of a CNN for detecting the nearest obstacles in accordance with the present invention. FIG. 3 is a drawing exemplary illustrating operations on the input image to describe the learning method of the CNN for detecting the nearest obstacles in accordance with the present invention.

By referring to FIGS. 2 and 3, processes of the learning method of the CNN for detecting the nearest obstacles in accordance with the present invention is described in detail as follows.

A process of detecting the nearest obstacles in accordance with the present invention may start with a step S01 of generating encoded feature maps and decoded feature maps from at least one input image. At the step of S01, if a learning device receives the input image as a training image, the learning device may instruct a first to an n-th convolutional layers to respectively and sequentially generate a first encoded feature map to an n-th encoded feature map from the training image, where the CNN for detecting the nearest obstacles may include the first to the n-th convolutional layers. Further, the CNN for detecting the nearest obstacles may include an n-th to a first deconvolutional layers corresponding to the first to the n-th convolutional layers, and the learning device may instruct the n-th to the first deconvolutional layers to respectively and sequentially generate an n-th decoded feature map to a first decoded feature map from the n-th encoded feature map.

For example, by referring to FIG. 3, the CNN for detecting the nearest obstacles may include the first convolutional layer 11 to a fifth convolutional layer 15 and a fifth deconvolutional layer 16 to the first deconvolutional layer 20, and the learning device may receive the training image 100 having a size of 640×256 with 3 ch. This training image is inputted into the first convolutional layer 11 which may generate the first encoded feature map 110 having a size of 320×128 with 8 ch, the second convolutional layer 12 which may generate the second encoded feature map 120 having a size of 160×64 with 16 ch, the third convolutional layer 13 which may generate the third encoded feature map 130 having a size of 80×32 with 32 ch, the fourth convolutional layer 14 which may generate the fourth encoded feature map 140 having a size of 40×16 with 64 ch, and the fifth convolutional layer 15 which may generate the fifth encoded feature map 150 having a size of 20×8 with 128 ch.

As such, the convolutional layers may increase channels of the input image or the feature maps, and may reduce their horizontal and vertical sizes, to thereby generate the encoded feature maps. For example, the second convolutional layer 12 to the fifth convolutional layer 15 may double the channels of the inputted feature map and may reduce its horizontal and vertical sizes in half, to thereby generate the encoded feature maps.

Meanwhile, the learning device may instruct the n-th deconvolutional layer corresponding to the n-th convolutional layer to increase a horizontal size of the n-th encoded feature map by a multiplier to thereby generate the n-th decoded feature map. For example, by referring to FIG. 3, the learning device may instruct the fifth deconvolutional layer 16 to generate the fifth decoded feature map 160 having a size of 40×8 with 64 ch from the fifth encoded feature map 150 having a size of 20×8 with 128 ch.

In general, a deconvolutional layer reduces the number channels and increases horizontal and vertical sizes, however, the n-th deconvolutional layer in accordance with the present invention reduces the number of the channels of the n-th encoded feature map and increases the horizontal size by the multiplier, e.g., two for doubling, but keeps the vertical size of the feature map. The reason is that, as aforementioned, determining which position has the highest score among the columns of the grid is enough for the present invention. That is, the present invention does not need to check every pixel, unlike a conventional segmentation, nor has need for increase of the vertical size. The present invention provides a method that horizontal resolutions of input and output are the same, thus, does not have a problem of lowering of horizontal resolution according to conventional techniques. Although a high vertical resolution is preferred, that will require too much computational load. Therefore, the present invention proposes a method that only the horizontal resolution is increased to detect the nearest obstacles with less computation. For this purpose, as aforementioned, the n-th deconvolutional layer may reduce the number of the channels of the n-th encoded feature map, and may increase the horizontal size by the multiplier, e.g., two for doubling, but does not change the vertical size.

Describing the process of decoding by referring to FIG. 3 again, the learning device may instruct the fourth deconvolutional layer 17 to generate the fourth decoded feature map 170 having size of 80×16 with 32 ch from the fifth decoded feature map 160 having a size of 40×8 with 64 ch, the third deconvolutional layer 18 to generate the third decoded feature map 180 having a size of 160×32 with 16 ch from the fourth decoded feature man 170 having a size of 80×16 with 32 ch, the second deconvolutional layer 19 to generate the second decoded feature map 190 having a size of 320×64 with 8 ch from the third decoded feature map 180 having a size of 160×32 with 16 ch, and the first deconvolutional layer 20 to generate the first decoded feature map 200 having a size of 640×128 with 4 ch from the second decoded feature map 190 having a size of 320×64 with 8 ch.

Thus, the deconvolutional layers may reduce the number of feature maps inputted, and may increase the horizontal and the vertical sizes, to thereby generate the decoded feature maps. For example, the fourth deconvolutional layer 17 to the first deconvolutional layer 20 may reduce the number of the channels in half and may double each of the horizontal and the vertical sizes of the inputted feature map, to thereby generate the decoded feature maps.

Meanwhile, the convolutional layers may perform at least one operation of convolution, max pooling, and ReLU, and the deconvolutional layers may perform at least one operation of deconvolution and ReLU.

Then, by referring to FIG. 2, the learning device may generate a first reshaped feature map with a size of $C_iH_i \times W_i \times 1$ using the decoded feature map with a size of $C_i \times W_i \times H_i$, where the $C_i$ is the number of the channels, the $W_i$ is a size of the columns, and the $H_i$ is a size of the rows of the decoded feature map at a step of S02.

That is, at a reshaping process in accordance with the present invention, supposing that each cell of the grid with a plurality of rows and a plurality of columns is generated by dividing the at least one decoded feature map with respect to the first direction by the first intervals and with respect to the second direction by the second intervals, the learning device may concatenate each of features of each of the rows per each of the columns in the direction of the channel, to thereby generate at least one reshaped feature map.

Figure 4:
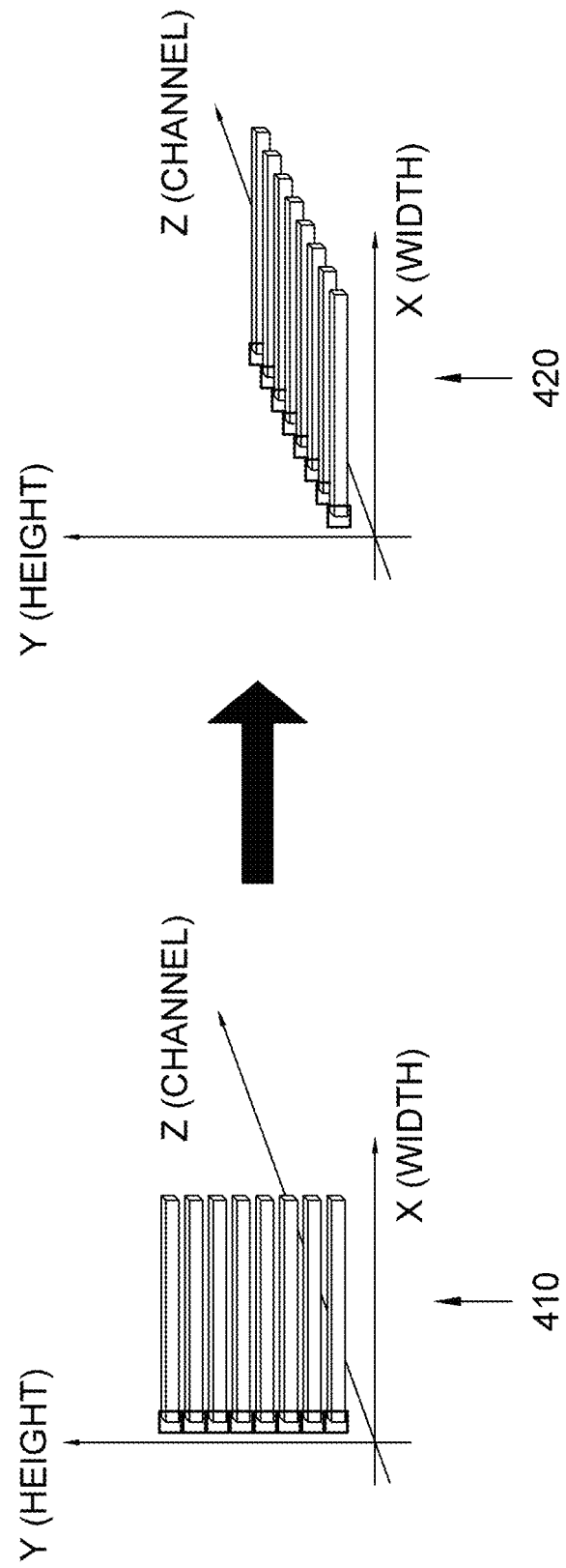
FIG. 4 is a drawing schematically illustrating a reshaping process for detecting the nearest obstacles in accordance with the present invention.

FIG. 4 is a drawing schematically illustrating the reshaping process for detecting the nearest obstacles in accordance with the present invention.

By referring to FIG. 4, at the reshaping process, a decoded feature map may be divided into rows as in the illustrated feature map 410, and each of the features of each of the rows per each of the columns may be concatenated in the direction of the channel as in the illustrated feature map 420. Thus, a feature map with a size of (C×W×H) may be converted into a feature map with a size of ((C×H)×W×1).

In the example of FIG. 4, each square with thick lines on the feature map 410 represents each feature in each row corresponding to the first column of the decoded feature map. Such features in each row are concatenated for each column in the direction of the channel. If the feature map 410 has 8 rows, the feature map 420 may have eight times the number of the channels and an eighth of the height of the feature map 410.

In the example of FIG. 3, the fifth decoded feature map 160 having a size of 40×8 with 64 ch may be converted to the first reshaped feature map 161 having a size of 40×1 with 64*8 ch by a first reshaping process, i.e., RESHAPE 5-1, the fourth decoded feature map 170 having a size of 80×16 with 32 ch may be converted to the first reshaped feature map 171 having a size of 80×1 with 32*16 ch by a first reshaping process, i.e., RESHAPE 4-1, the third decoded feature map 180 having a size of 160×32 with 16 ch may be converted to the first reshaped feature map 181 having a size of 160×1 with 16*32 ch by a first reshaping process, i.e., RESHAPE 3-1, the second decoded feature map 190 having a size of 320×64 with 8 ch may be converted to the first reshaped feature map 191 having a size of 320×1 with 8*64 ch by a first reshaping process, i.e., RESHAPE 2-1, and the first decoded feature map 200 having a size of 640×128 with 4 ch may be converted to the first reshaped feature map 201 having a size of 640×1 with 4*128 ch by a first reshaping process, i.e., RESHAPE 1-1.

For reference, although the first reshaping process is illustrated in FIG. 3 as performed on every decoded feature map, it is not a requirement that every decoded feature map be reshaped, therefore, reshaping a part of the decoded feature maps should suffice.

Then, at a step of S03, the first reshaped feature map with a size of $C_iH_i \times W_i \times 1$ may be converted to the first reshaped feature map with a size of $$\left(\frac{W_I}{W_i} \times N_c\right) \times W_i \times 1$$

by the convolution operations. Herein, the $W_I$ is a column size of the training image and the $W_i$ is the size of the columns of the decoded feature map. The convolution operation is a 1×1 convolution, whose operands are cells in the grid which range over all of the channels but over just one unit horizontally and vertically, to find out where each of bottom lines of the nearest obstacles is positioned in each of $N_c$ columns of each first reshaped feature map, where $N_c$ is the number the second direction of the input image is divided into. All information on the decoded feature maps along the column direction has been integrated into the channels, for simultaneous operations on all the information, at the first reshaping process, therefore, the convolution operation makes it possible to check all pieces of information on the channels, to thereby find out where each of the bottom lines of each of the nearest obstacles is positioned for each column.

Clearly, in case of the example of the fifth decoded feature map 160, the first reshaping operation and the 1×1 convolution operation may be performed simultaneously if an 8×1 convolution without reshaping is performed. That is, if a height of a specific feature map is N, N×1 convolution may be used. However, in general, the 1×1 convolution operation is implemented on hardware for quick calculation, although an 8×1 kernel or N×1 kernel, which is rarely used, is very slow on calculation. Therefore, it is more effective to separate the reshaping operation and the 1×1 convolution operation.

By referring to a result of the 1×1 convolution operation, if the column size of the inputted feature map is $W_i$ and the column size of the original image is $W_I$, the inputted feature map may be converted to have channels of $$\frac{W_I}{W_i} \times N_c.$$

In the example of FIG. 3, the first reshaped feature map 161 having a size of 40×1 with 64*8 ch of the fifth decode feature map may be converted to the first reshaped feature map 162 having a size of 40×1 with $N_c$*16 ch by the 1×1 convolution operation, the first reshaped feature map 171 having a size of 80×1 with 32*16 ch of the fourth decoded feature map may be converted to the first reshaped feature map 172 having a size of 80×1 with $N_c$*8 ch by the 1×1 convolution operation, the first reshaped feature map 181 having a size of 160×1 with 16*32 ch of the third decoded feature map may be converted to the first reshaped feature map 182 having a size of 160×1 with $N_c$*4 ch by the 1×1 convolution operation, the first reshaped feature map 191 having a size of 320×1 with 8*64 ch of the second decoded feature map may be converted to the first reshaped feature map 192 having a size of 320×1 with $N_c$*3 ch by the 1×1 convolution operation, and the first reshaped feature map 201 having a size of 640×1 with 4*128 ch of the first decoded feature map may be converted to the first reshaped feature map 202 having a size of 640×1 with $N_c$ ch by the 1×1 convolution operation.

By referring to FIG. 2 again, at a step of S04, the first reshaped feature map having a size of $$\left(\frac{W_I}{W_i} \times N_c\right) \times W_i \times 1$$

may be converted to a second reshaped feature map having a size of $N_c \times W_I \times 1$. Herein, the $N_c$ is the number of the rows into which the second direction of the input image is divided for specifying where each of the bottom lines of each of the nearest obstacles is located on each of the columns.

Then at a step of S05, a softmax operation is performed that normalizes each of values corresponding to the $N_c$ channels for each of the columns of the second reshaped feature map, and at a step of S06, the segmentation result is generated representing each of estimated positions of each of the bottom lines of each of the nearest obstacles in each of the specific rows, per each of the columns in the input image, where each of the nearest obstacles is estimated as located by checking each of the columns from its corresponding lowest cell therein along the second direction.

At the step of S04, i.e., the second reshaping process, the outputted feature map having a size of $$\left(\frac{W_I}{W_i} \times N_c\right) \times W_i \times 1$$

may be modified to have a size of $N_c \times W_I \times 1$, with its data fixed but only its shape changed. At the step of S05, i.e., the softmax process, the values of the $N_c$ channels per column may be normalized so that their values range from 0 to 1, then each position of each of the bottom lines of each of the nearest obstacles per each of the columns may be estimated by searching each specific channel with each corresponding highest value by referring to the normalized values.

Accordingly, feature maps may be generated by the 1×1 convolution operation at the step of S03 and the reshaping operation at the step of S04, such that each of the estimated positions of the each of the bottom lines of the each of the nearest obstacles among the rows per each of the columns may be allowed to have each corresponding highest value, and the rest of positions, i.e., the rest of rows, among the rows per each of the columns may be allowed to have lower values. The softmax operation at the step of S05 may be used for finding each largest value among each of the $N_c$ values for each column of the input image then outputting it, to thereby locate each of the positions of each of the nearest obstacles. Then, if each of the bottom lines of each of the nearest obstacles is estimated as present in each specific channel with each corresponding highest value among values of the channels per each of the columns by referring to the normalized values, the segmentation result may be generated such that each of the estimated positions of the each of the bottom lines of the nearest obstacles among the rows per each of the columns has each corresponding highest value and the rest of positions among the rows per each of the columns have lower values, among the $N_c$ rows.

To understand this process, one needs to understand the shape of a final result, i.e., a result of the softmax operation. The desired output from the learning method of the CNN may be finding each row with each corresponding highest value among the $N_c$ rows for each of the columns in the input image as the position of the nearest obstacles. In order to do so, $N_c$ scores per column may be required. If the number, i.e., the width of the input image, of the columns in the input image is 640, i.e., 640 pixels or 640 columns, then a score map having a size of $N_c$ (channel)×640(width)×1(height) may be calculated as an output.

The process of generating the score map having a size of $N_c$ (channel)×640(width)×1(height) as the output is as follows. For example, if the first reshaped feature map 161 having a size of 512(64*8) (channel)×40(width)×1(height) of the fifth decoded feature map by the first reshaping process, i.e., RESHAPE 5-1, is generated, this first reshaped feature map may have forty columns, only a sixteenth of those of the input image. Thus, in this case, sixteen $N_c$ output scores generated from sixteen times of the 1×1 convolution operations may suffice. Therefore, the size of the output 162 from CONV_OUT5 in FIG. 3 must be designed to be ($N_c$*16) (channel)×40(width)×1(height). Then, the second reshaping process, i.e., RESHAPE 5-2, may be needed to convert the score map having a size of ($N_c$*16)(channel)× 40(width)×1(height) to the scope map having a size of $N_c$(channel)×640(width)×1(height).

By referring to the example in FIG. 3, the feature map 162 having a size of 40×1 with $N_c$ *16 ch may be converted to the feature map 163 having a size of 640×1 with $N_c$ ch by the 1×1 convolution, i.e., CONV_OUT5, and an output 164 is generated such that each of the estimated positions of each of the bottom lines of each of the nearest obstacles among the rows per each of the columns has each corresponding highest value, and that the rest of positions among the rows per each of the columns have lower values, among the $N_c$ rows per each column of 640 by the softmax operation. Then, the feature map 172 having a size of 80×1 with $N_c$ *8 ch, the feature map 182 having a size of 160×1 with $N_c$ *4 ch, the feature map 192 having a size of 320×1 with $N_c$ *2 ch, and the feature map 202 having a size of 640×1 with $N_c$ ch are respectively converted to each of the feature maps 173, 183, 193, and 203 having a size of 640×1 with $N_c$ ch by each of the 1×1 convolution operations of CONV_OUT4 to CONV_OUT1, and then each of outputs 174, 184, 194, and 204 is generated such that each of the estimated positions of each of the bottom lines of the nearest obstacles among the rows per each of the columns has each corresponding highest value, and that the rest of the positions among the rows per each of the columns have lower values, among the $N_c$ rows per each column of 640 by the softmax operation.

That is, the learning device may generate the segmentation result representing each of the estimated positions, in the at least one decoded feature map, where each of the bottom lines of each of the nearest obstacles is estimated as located by checking each of the columns from its corresponding lowest cell therein along the second direction, i.e., upwards. The learning device may generate the segmentation result by checking each of the estimated positions of each of the bottom lines of each of the nearest obstacles on concatenated channels for each of the columns of the reshaped feature map.

By referring to FIG. 2 again, at least one loss may be generated by referring to the segmentation result and its corresponding at least one GT image at a step of S07, and parameters of the CNN may be learned or optimized by backpropagating the loss at a step of S08.

Herein, the GT image may be an image in which each of exact rows is indicated as corresponding to each of GT positions where each nearest obstacle is truly located on each of the columns from its corresponding lowest cell therein along the second direction, i.e., upwards. FIG. 5. is a drawing exemplarily illustrating the input image and its corresponding GT image for detecting the nearest obstacles in accordance with the present invention. By referring to FIG. 5, the GT image may be generated by designating a nearest object as the nearest obstacle when checking from the bottom to the top per each column, i.e., per column acquired by dividing 640 pixels by the first intervals or per each pixel of the 640 pixels, in the input image. Because the GT image includes information representing on which row each of the bottom lines of each of the nearest obstacles is truly located among the $N_c$ rows, per each of the columns in the input image, and the segmentation result includes information representing on which row each of the bottom lines of each of the nearest obstacles estimated as located among the $N_c$ rows, per each of the columns in the input image, all of the reshaped feature maps 164, 174, 184, 194, and 204 resulting from reshaping the decoded feature map may be generated as having the $N_c$ channels.

The loss at the step of S07 may be a cross-entropy loss. The loss may be backpropagated for learning or optimizing the parameters of the CNN. In the example of FIG. 3, outputs are generated by using five decoded feature maps and thus five losses are generated, however, the backpropagation may be performed by referring to the loss and the outputs from at least part of the five decoded feature maps. Especially, although it is preferable that the loss be used which is generated by referring to the first decoded feature map outputted from the first convolutional layer 20, it is not a requirement.

On condition that the parameters of the CNN have been learned via the above processes, a testing device using the CNN with the learned parameters may detect nearest obstacles from at least one test image as the input image.

Figure 6:
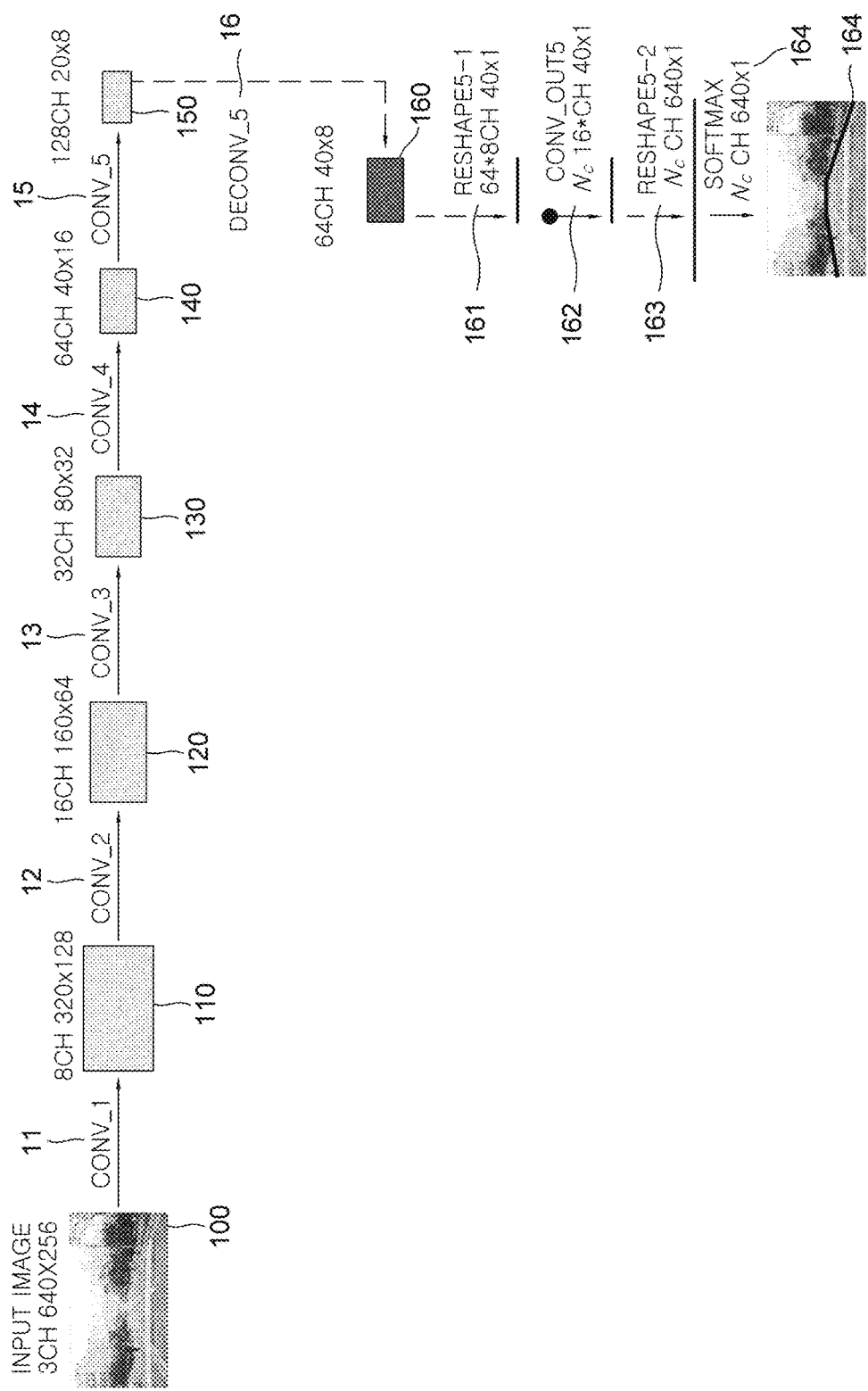
FIG. 6 is a drawing exemplary illustrating operations on the input image to describe a testing method of the CNN for detecting the nearest obstacles in accordance with the present. invention.

FIG. 6 is a drawing exemplarily illustrating operations on the input image to describe a testing method of the CNN for detecting the nearest obstacles in accordance with the present invention. By referring to FIG. 6, unlike the learning device in FIG. 3, a single output suffices, and the fourth deconvolutional layer to the first deconvolutional layer may be omitted because the output may be directly generated using the fifth decoded feature map. As another example, some of the omitted deconvolutional layers may be included.

Detailed explanation of the processes is similar to the description by referring to FIG. 3, thus detecting the nearest obstacles by referring to FIG. 6 is briefly described as follows. First, the testing device may receive the test image 100 and may instruct the first to the n-th convolutional layers 11 to 15 to respectively and sequentially generate a first encoded feature map for testing to an n-th encoded feature map for testing 110, 120, 130, 140, and 150 from the test image 100. Then, the testing device may instruct at least one deconvolutional layer 16 to generate a decoded feature map 160 for testing from the n-th encoded feature map 150 for testing. Then, a reshaped feature map 161 for testing may be generated by concatenating, in a direction of the channel, each of features of each of the rows per each of the columns arranged in the second direction, by referring to the grid, from the decoded feature map 160 for testing. Then, a feature map 162 for testing with channels changed by the 1×1 convolution operations and additional reshaping processes, and a feature map 163 for testing with its channels changed to $N_c$ and the horizontal number of its columns changed to the horizontal number of the test image are generated. Then, the testing device may generate a segmentation result 164 for testing by checking each of the estimated positions of each of the bottom lines of each of the nearest obstacles among the rows per each of the columns on concatenated channels per each of the columns of the reshaped feature map for testing, to thereby detect the nearest obstacles.

Figure 7A:
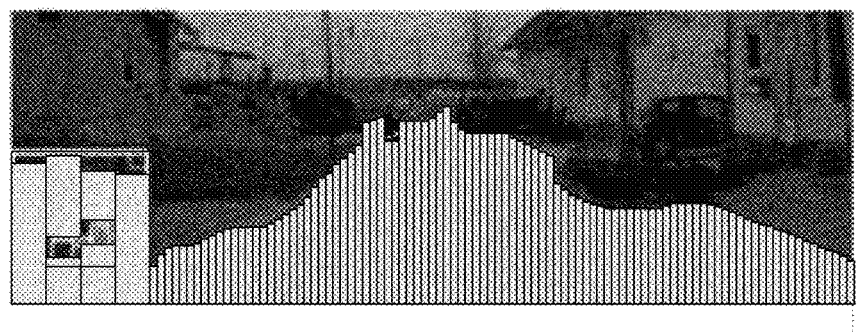
FIG. 7A is a drawing schematically illustrating a result of a conventional object detection.
Figure 7B:
FIGS. 7B and 7C are drawings schematically illustrating a result of object detection in accordance with the present invention.
Figure 7C:

FIG. 7A is a drawing schematically illustrating a result of the conventional object detection. FIGS. 7B and 7C are drawings schematically illustrating the result of the object detection in accordance with the present invention.

FIG. 7A illustrates an example of detecting the nearest obstacles according to the conventional method, which has to check every pixel to determine whether the pixel corresponds to the lane or not, and as a result, its computational load is heavy. However, FIGS. 7B and 7C illustrate the method in accordance with the present invention which detects the nearest obstacles by checking the grid cells of a certain number, e.g., $N_c$, from the bottom to the top of an image to estimate positions where each of the bottom lines of each of the nearest obstacles is located, as indicated in green, and as a result, the nearest obstacles in a high-resolution image are quickly detected with less computation.

Further, the conventional method has a problem that the horizontal resolution of the detection result is lower than the resolution of the input image due to time required for its processing, however, the method in accordance with the present invention resolves this problem because the horizontal resolutions of the input image and the output result are the same.

Additionally, the present invention may utilize high-resolution information when learning by using multi-loss, then in a real-world test, high-resolution outputs are generated using only low-resolution feature maps. Therefore, less computation and quick processing are achieved by outputting high-resolution information from the low-resolution feature maps.

FIG. 8 is a flow chart schematically illustrating a process detecting one or more ROIs (Regions Of Interest) in accordance with the present invention.

By referring to FIG. 8, the method for detecting the ROIs by referring to information on each of the bottom lines of each of the nearest obstacles generated using the method for detecting the nearest obstacles aforementioned is described below.

First, by referring to FIG. 8, at least one obstacle segmentation result is generated from the input image at a step of S81, by using the method for detecting the nearest obstacles described by referring to FIGS. 2 to 7. This is the same as the step of S06 in FIG. 2.

As described in detail by referring to FIGS. 2 to 6 supposing that each cell of the grid has been generated by dividing the at least one specific decoded feature map, the learning device may generate or support another device to generate the obstacle segmentation result representing each of the specific rows, determined by referring to values of channels concatenated for each of the columns, where each of lowest parts of each of the nearest obstacles is positioned, by referring to at least one feature of at least part of the n-th decoded feature map to the first decoded feature map. Herein, the obstacle segmentation result may be acquired by a softmax operation which normalizes each value corresponding to each of the rows for each of the columns, e.g., said each value may have values from 0 to 1 as a result.

Then, at least one obstacle loss may be calculated at a step of S82, by referring to (i) at least one GT image in which each of the exact rows is indicated as corresponding to each of GT positions where each of the bottom lines of each of the nearest obstacles is truly located per each of the columns from its corresponding lowest cell therein along the second direction, and (ii) the obstacle segmentation result in which each of the specific rows is estimated as each of the bottom lines of each of the nearest obstacles per each of the columns. This is the same as the step of S07 in FIG. 2.

Then, each anchor as each basis for generating anchor boxes to be used for detecting each of the ROIs may be determined, among pixels in each of anchoring rows determined based on each of the specific rows, per each of the columns, at a step of S83. For example, each of the anchoring rows per each of the columns may be positioned within each of first distances in the second direction from each of the specific rows per each of the columns and each of second distances in a direction opposite to the second direction from each of the specific rows per each of the columns. Then, the RPN may set at least one of the anchor boxes based on said each anchor at a step of S84, and may generate at least one ROI bounding box by referring to each of the anchor boxes at a step of S85 where the ROI bounding box is a specific anchor box, having a high probability of being estimated as including a specific object, among the anchor boxes.

Figure 9A:
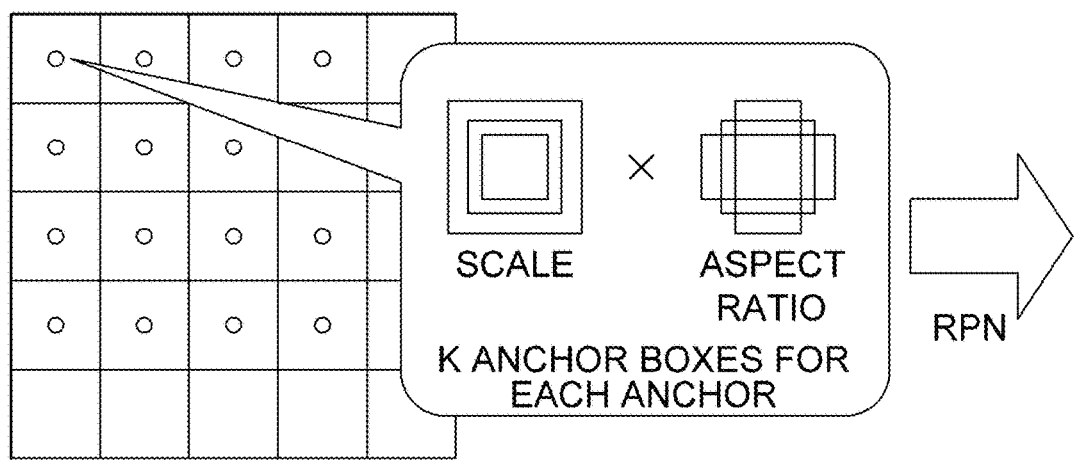
FIG. 9A. is a drawing schematically illustrating a process using a conventional RPN.

That is, when detecting bounding boxes of the nearest obstacles in the input image, each of the lowest parts of each of the nearest obstacles found at the step of S81 may be determined as each of the bottom lines of each of the nearest obstacles, and the RPN may perform an operation on only regions nearby the bottom lines FIG. 9A is a drawing schematically illustrating a process using the conventional RPN, and FIG. 9B is a drawing schematically illustrating a process using the RPN in accordance with the present invention.

By referring to FIG. 9A, the process using the conventional RPN sets each anchor for every point in the feature map, generates multiple different anchor boxes with different scales or different aspect ratios for each anchor, and performs RPN operations. Herein, said every point may be each pixel, or a pixel at certain intervals.

Compared to this, in the process using the RPN shown in FIG. 9B in accordance with the present invention, certain regions 921, shown as white solid circles, near the nearest obstacles 911 are set as anchors, but points or pixels 922 in other regions, shown as black solid circles, are not set as anchors, in an image 910 where bottom parts 911 of the nearest obstacles are indicated.

That is, lines 911 shown in FIG. 9B may be identified as detected bottom lines of the nearest obstacles, points 921 within certain ranges in the second direction from the identified bottom lines may be set as the anchors, multiple different anchor boxes may be set for each of the anchors per scale or aspect ratio of the multiple different anchor boxes, and then the RPN operations may be performed.

Herein, each of the columns may include one or more pixels in the first direction, and each of the rows may include one or more pixels in the second direction, therefore the points or pixels 922 may be pixels per each column in a direction of the columns or may be one of the cells in the grid divided into $N_c$.

As can be seen from above, calculation is performed only on the anchor boxes based on the anchors near the nearest obstacles, and the computational load on the RPN is significantly reduced. Further, by increasing the number of the anchor boxes per anchor, that is, increasing the number of the scales and the aspect ratios, the result of the object detection is improved, therefore there is an additional effect of reducing the computational load and increasing the number of possible combinations of the anchor boxes.

By referring to FIG. 8 again, at least one bounding box loss or at least one RPN loss may be generated by referring to the estimated bounding box and its corresponding GT image with each of one or more bounding boxes truly including each of the nearest obstacles in the input image at a step of S86, and the bounding box loss may be backpropagated to thereby learn the parameters of the CNN at a step of S87. Herein, at the step of S87, the parameters of the CNN may be learned by using both the obstacle loss generated at the step of S82 and the bounding box loss generated at the step of S86. For example, if the parameters of the CNN for detecting the nearest obstacles have been learned, one or more weights for the obstacle loss may be set to be small, and one or more weights for the bounding box loss may be set to be large, and then the backpropagation may be performed.

The learning method shown in FIGS. 8, 9B, and 9C may apply to the testing method.

That is, the testing method using the CNN capable of detecting the ROIs determined based on the bottom lines of the nearest obstacles in at least one input image may include steps of a testing device, which uses the parameters of the CNN learned by the learning device, acquiring the input image as a test image, (a) on condition that the learning device has performed processes of (i) acquiring the input image as a training image and instructing the first convolutional layer to the n-th convolutional layer to respectively and sequentially generate a first encoded feature map for training to an n-th encoded feature map for training from the input image; (ii) instructing the n-th deconvolutional layer to the first deconvolutional layer to sequentially generate an n-th decoded feature map for training to a first decoded feature map for training from the n-th encoded feature map for training; (iii) if each cell of a grid with a plurality of rows and a plurality of columns is generated by dividing at least one specific decoded feature map for training, among the n-th decoded feature map for training to the first decoded feature map for training, with respect to a first direction and a second direction, wherein the first direction is in a direction of the rows of the specific decoded feature map for training and the second direction is in a direction of the columns thereof, generating at least one obstacle segmentation result for training which represents each of specific rows for training, determined by referring to values of channels concatenated for each of the columns, where each of bottom lines for training of each of nearest obstacles for training is estimated as being positioned per each of the columns, by referring to at least one feature for training of at least. part of the n-th decoded feature map for training to the first decoded feature map for training, wherein the obstacle segmentation result for training is determined by a softmax operation which normalizes each value for training corresponding to each of the rows for each of the columns; (iv) determining each anchor for training as each basis for generating anchor boxes for training to be used for detecting each of the ROIs for training, among pixels in each of anchoring rows for training estimated on basis of each of the specific rows for training, per each of the columns; (v) instructing the RPN to generate (v-1) at least one ROI bounding box for training by referring to each of the anchor boxes for training wherein at least one of the anchor boxes for training is estimated on basis of said each anchor for training, and (v-2) at least one first loss by referring to the ROI bounding box for training and its corresponding at least one first GT, wherein the ROI bounding box for training is a specific anchor box for training, having a high probability of being estimated as including a specific object, among the anchor boxes for training and wherein the first GT represents a bounding box truly including the specific object in the input image; and (vi) backpropagating the first loss, to thereby learn the parameters of the CNN, (b) the testing device acquiring the input image and instructing the first convolutional layer to the n-th convolutional layer to respectively and sequentially generate a first encoded feature map for testing to an n-th encoded feature map for testing from the input image; (c) the testing device instructing the n-th deconvolutional layer to the first deconvolutional layer to sequentially generate an n-th decoded feature map for testing to a first decoded feature map for testing from the n-th encoded feature map for testing; (d) the testing device, if each cell of the grid generated by dividing at least one specific decoded feature map for testing, among the n-th decoded feature map for testing to the first decoded feature map for testing, with respect to the first direction and the second direction, generating at least one obstacle segmentation result for testing which represents each of specific rows for testing, where each of the bottom lines for testing of each of the nearest obstacles for testing is estimated as being positioned, by referring to at least one feature for testing of at least part of the n-th decoded feature map for testing to the first decoded feature map for testing, wherein the obstacle segmentation result for testing is determined by a softmax operation which normalizes each value for testing corresponding to each of the rows for each of the columns; (e) the testing device determining each anchor for testing as each basis for generating anchor boxes for testing to be used for detecting each of the ROIs for testing, among pixels in each of anchoring rows for testing estimated on basis of each of the specific rows for testing, per each of the columns; (f) the testing device instructing the RPN to generate at least one ROI bounding box for testing by referring to each of the anchor boxes for testing wherein at least one of the anchor boxes for testing is estimated on basis of said each anchor for testing.

As result, the new method for detecting the nearest obstacles in accordance with the present invention is used for detecting the bottom lines of the nearest obstacles, and computational load of detecting the ROIs is significantly reduced by performing the operations only on nearby regions of the bottom lines of the object.

As can be understood by those skilled in the art, it is clear that communication parts of the learning device and the testing device may perform transmission of image data, for example, images described above like the training image, the test image, and the input image, etc., and that processors and/or memories of the learning device and the testing device may retain data for feature maps and performing operations, and that the processors of the learning device and the testing device may perform convolution operations, deconvolution operations, and loss value operations, but the scope of the present invention is not limited thereto.

The present invention has an effect of determining paths for the autonomous vehicles by detecting on which rows the nearest obstacles are positioned in each of the columns on the grid generated by dividing the input image by certain intervals.

The present invention has another effect of detecting the nearest obstacles with less computation, without checking every pixel in the input image.

The present invention has still another effect of significantly reducing computational load of detecting the ROIs by applying the new method for detecting the nearest obstacles to detection of the bottom lines of the nearest obstacles and performing the RPN operation only on nearby regions of the bottom lines of the object.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought the present invention must not be confined to the explained embodiments, and the following patent claims as well as everything including variations equal or equivalent to the patent claims pertain to the category of the thought of the present invention.

What is claimed is:

1. A method for learning parameters of a convolutional neural network (CNN) capable of detecting one or more regions of interest (ROIs) determined based on one or more bottom lines of one or more nearest obstacles in at least one input image, comprising steps of:
    (a) a learning device instructing a first convolutional layer to an n-th convolutional layer to respectively and sequentially generate a first encoded feature map to an n-th encoded feature map from the at least one input image;
    (b) the learning device instructing an n-th deconvolutional layer to a first deconvolutional layer to sequentially generate an n-th decoded feature map to a first decoded feature map from the n-th encoded feature map;
    (c) the learning device, supposing that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the at least one specific decoded feature map and the second direction is in a direction of the columns thereof, generating at least one obstacle segmentation result representing each of specific rows, where each of the bottom lines of each of the nearest obstacles is estimated as being located per each of the columns, by referring to at least one feature of at least part of the n-th decoded feature map to the first decoded feature map;
    (d) the learning device, determining each anchor as each basis for generating anchor boxes to be used for detecting each of the ROIs, among pixels in each of anchoring rows estimated on basis of each of the specific rows, per each of the columns;
    (e) the learning device instructing a Region Proposal Network (RPN) to generate (i) at least one ROI bounding box by referring to each of the anchor boxes wherein at least one of the anchor boxes is estimated on basis of said each anchor, and (ii) one or more first losses by referring to the at least one ROI bounding box and its corresponding at least one first ground truth (GT), wherein the at least one ROI bounding box is a specific anchor box, having a high probability of being estimated as including a specific object, among the anchor boxes and wherein the at least one first GT represents a bounding box truly including the specific object in the at least one input image; and
    (f) the learning device backpropagating the one or more first losses, to thereby learn the parameters of the CNN.

2. The method of claim 1, wherein the step of (c) includes steps of:
    (c1) the learning device, supposing that each cell of the grid has been generated by dividing the at least one specific decoded feature map with respect to the first direction by first intervals and with respect to the second direction by second intervals, concatenating each of features of each of the rows per each of the columns in a direction of a channel, to thereby generate at least one reshaped feature map; and
    (c2) the learning device generating the at least one obstacle segmentation result which represents where each of the bottom lines of each of the nearest obstacles is estimated as located among the rows for each of the columns by referring to the at least one reshaped feature map via checking each of estimated positions of each of the bottom lines of each of the nearest obstacles on concatenated channels for each of the columns, wherein the at least one obstacle segmentation result is generated by a softmax operation which normalizes each value corresponding to each channel per each of the columns.

3. The method of claim 2, wherein the step of (c) includes a step of:
    (c3) the learning device generating one or more second losses by referring to (i) each location of exact rows where each of the bottom lines of each of the nearest obstacles is truly positioned per each of the columns on at least one second GT image, for each of the columns, and (ii) each location of the specific rows, where each of the bottom lines of each of the nearest obstacles is estimated as being positioned per each of the columns, on the at least one obstacle segmentation result; and
    wherein, at the step of (f) the one or more first losses and the one or more second losses are backpropagated, to thereby learn the parameters of the CNN.

4. The method of claim 1, wherein, at the step of (e), multiple different anchor boxes are set for said each anchor by referring to at least one of (i) at least one scale and (ii) at least one aspect ratio, of at least one of the anchor boxes.

5. The method of claim 1, wherein each of the columns includes one or more pixels in the first direction, and each of the rows includes one or more pixels in the second direction.

6. The method of claim 1, wherein the at least one first GT includes information on which row each of the bottom lines of each of the nearest obstacles is truly located among the rows, per each of the columns, on condition that the at least one input image is divided into $N_c$ rows, and wherein the at least one obstacle segmentation result represents on which row each of the bottom lines of each of the nearest obstacles is estimated as located among the rows, per each of the columns, on condition that the at least one input image is divided into the $N_c$ rows.

7. The method of claim 6, wherein, at the step of (c), if each of the bottom lines of each of the nearest obstacles is estimated as present for each of the columns, the at least one obstacle segmentation result is generated such that each of the estimated positions of the each of the bottom lines in each of the specific rows per each of the columns is allowed to have each corresponding highest value, and positions in other rows among the rows are allowed to have lower values, among the $N_c$ rows.

8. A method for testing a convolutional neural network (CNN) capable of detecting one or more regions of interest (ROIs) for testing based on one or more bottom lines of one or more nearest obstacles for testing in at least one test image, comprising steps of:

(a) a testing device acquiring the at least one test image, on condition that a learning device has performed processes of (1) instructing a first convolutional layer to an n-th convolutional layer to respectively and sequentially generate a first encoded feature map for training to an n-th encoded feature map for training from at least one training image, (2) instructing an n-th deconvolutional layer to a first deconvolutional layer to sequentially generate an n-th decoded feature map for training to a first decoded feature map for training from the n-th encoded feature map for training, (3) if each cell of a grid with a plurality of rows and a plurality of columns is generated by dividing at least one specific decoded feature map for training, among the n-th decoded feature map for training to the first decoded feature map for training, with respect to a first direction and a second direction, wherein the first direction is in a direction of the rows of the at least one specific decoded feature map for training and the second direction is in a direction of the columns thereof, generating at least one obstacle segmentation result for training representing each of specific rows for training, where each of bottom lines of each of one or more nearest obstacles for training is estimated as being located per each of the columns, by referring to at least one feature of at least part of the n-th decoded feature map for training to the first decoded feature map for training, (4) determining each anchor for training as each basis for generating anchor boxes for training to be used for detecting each of one or more ROIs for training, among pixels in each of anchoring rows for training estimated on basis of each of the specific rows for training, per each of the columns. (5) instructing an a Region Proposal Network (RPN) to generate (i) at least one ROI bounding box for training by referring to each of the anchor boxes for training wherein at least one of the anchor boxes for training is estimated on basis of said each anchor for training, and (ii) at least one first loss by referring to the at least one ROI bounding box for training and its corresponding at least one first ground truth (GT), wherein the at least one ROI bounding box for training is a specific anchor box for training, having a high probability of being estimated as including a specific object for training, among the anchor boxes for training and wherein the at least one first GT represents a bounding box for training truly including the specific object for training in the at least one training image, and (6) backpropagating the at least one first loss, to thereby learn parameters of the CNN;

(b) the testing device instructing the first convolutional layer to the n-th convolutional layer to respectively and sequentially generate a first encoded feature map for testing to an n-th encoded feature map for testing from the at least one test image;

(c) the testing device instructing the n-th deconvolutional layer to the first deconvolutional layer to sequentially generate an n-th decoded feature map for testing to a first decoded feature map for testing from the n-th encoded feature map for testing;

(d) the testing device, supposing that each cell of a grid with a plurality of rows and a plurality of columns is generated by dividing at least one specific decoded feature map for testing, among the n-th decoded feature map for testing to the first decoded feature map for testing, with respect to a first direction and a second. direction, wherein the first direction is in a direction of the rows of the at least one specific decoded feature map for testing and the second direction is in a direction of the columns thereof, generating at least one obstacle segmentation result for testing representing each of specific rows for testing, where each of the bottom lines of each of the nearest obstacles for testing is estimated as being located per each of the columns, by referring to at least one feature of at least part of the n-th decoded feature map for testing to the first decoded feature map for testing;

(e) the testing device determining each anchor for testing as each basis for generating anchor boxes for testing to be used for detecting each of the one or more ROIs for testing, among pixels in each of anchoring rows for testing estimated on basis of each of the specific rows for testing, per each of the columns; and (f) the testing device instructing the RPN to generate at least one ROI bounding box for testing by referring to each of the anchor boxes for testing wherein at least one of the anchor boxes for testing is estimated on basis of said each anchor for testing.

9. The method of claim 8, wherein the step of (d) includes steps of:

(d1) the testing device, supposing that each cell of the grid has been generated by dividing the at least one specific decoded feature map for testing with respect to the first direction by first intervals and with respect to the second direction by second intervals, concatenating each of features for testing of each of the rows per each of the columns in a direction of a channel, to thereby generate at least one reshaped feature map for testing; and (d2) the testing device generating the at least one obstacle segmentation result for testing which represents where each of the bottom lines of each of the nearest obstacles for testing is estimated as located among the rows for each of the columns by referring to the at least one reshaped feature map for testing via checking each of estimated positions of each of the bottom lines of each of the nearest obstacles for testing on concatenated channels for each of the columns, wherein the at least one obstacle segmentation result for testing is generated by a softmax operation which normalizes each value corresponding to each channel per each of the columns.

10. The method of claim 8, wherein, at the step of (f), multiple different anchor boxes for testing are set for said each anchor for testing by referring to at least one of (i) at least one scale and (ii) at least one aspect ratio, of at least one of the anchor boxes for testing.

11. The method of claim 8, wherein each of the columns includes one or more pixels in the first direction, and each of the rows includes one or more pixels in the second direction.

12. The method of claim 8, wherein the at least one first GT includes information on which row each of the bottom lines of each of the nearest obstacles for testing is truly located among the rows, per each of the columns, on condition that the at least one test image is divided into $N_c$ rows, and wherein the at least one obstacle segmentation result for testing represents on which row each of the bottom lines of each of the nearest obstacles for testing is estimated as located among the rows, per each of the columns, on condition that the at least one test image is divided into the $N_c$ rows, and wherein, at the step of (d), if each of the bottom lines of each of the nearest obstacles for testing is estimated as present for each of the columns, the at least one obstacle segmentation result for testing is generated such that each of the estimated positions of the each of the bottom lines in each of the specific rows for testing per each of the columns is allowed to have each corresponding highest value, and positions in other rows among the rows are allowed to have lower values, among the $N_c$ rows.

13. A learning device for learning parameters of a convolutional neural network (CNN) capable of detecting one or more regions of interest (ROIs) determined based on one or more bottom lines of one or more nearest obstacles in at least one input image, comprising:
a communication part for acquiring the at least one input image; and
a processor for performing processes of (I) instructing a first convolutional layer to an n-th convolutional layer to respectively and sequentially generate a first encoded feature map to an n-th encoded feature map from the at least one input image, (II) instructing an n-th deconvolutional layer to a first deconvolutional layer to sequentially generate an n-th decoded feature map to a first decoded feature map from the nth encoded feature map, (III) if each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the at least one specific decoded feature map and the second direction is in a direction of the columns thereof, generating at least one obstacle segmentation result representing each of specific rows, where each of the bottom lines of each of the nearest obstacles is estimated as being located per each of the columns, by referring to at least one feature of at least part of the n-th decoded feature map to the first decoded feature map, (IV) determining each anchor as each basis for generating anchor boxes to be used for detecting each of the ROIs, among pixels in each of anchoring rows estimated on basis of each of the specific rows, per each of the columns, (V) instructing a Region Proposal Network (RPN) to generate (i) at least one ROI bounding box by referring to each of the anchor boxes wherein at least one of the anchor boxes is estimated on basis of said each anchor, and (ii) one or more first losses by referring to the at least one ROI bounding box and its corresponding at least one first ground truth (GT), wherein the at least one ROI bounding box is a specific anchor box, having a high probability of being estimated as including a specific object, among the anchor boxes and wherein the at least one first GT represents a bounding box truly including the specific object in the at least one input image, and (VI) backpropagating the one or more first losses, to thereby learn the parameters of the CNN.

14. The learning device of claim 13, wherein the process of (III) includes processes of
(III-1) if each cell of the grid has been generated by dividing the at least one specific decoded feature map with respect to the first direction by first intervals and with respect to the second direction by second intervals, concatenating each of features of each of the rows per each of the columns in a direction of a channel, to thereby generate at least one reshaped feature map; and
(III-2) generating the at least one obstacle segmentation result which represents where each of the bottom lines of each of the nearest obstacles is estimated as located among the rows for each of the columns by referring to the at least one reshaped feature map via checking each of estimated positions of each of the bottom lines of each of the nearest obstacles on concatenated channels for each of the columns, wherein the at least one obstacle segmentation result is generated by a softmax operation which normalizes each value corresponding to each channel per each of the columns.

15. The learning device of claim 14, wherein the process of (III) includes a process of:
(III-3) generating one or more second losses by referring to (i) each location of exact rows where each of the bottom lines of each of the nearest obstacles is truly positioned per each of the columns on at least one second GT image, for each of the columns, and (ii) each location of the specific rows, where each of the bottom lines of each of the nearest obstacles is estimated as being positioned per each of the columns, on the at least one obstacle segmentation result; and
wherein, at the process of (VI), the one or more first losses and the one or more second losses are backpropagated, to thereby learn the parameters of the CNN.

16. The learning device of claim 13, wherein, at the process of (V), multiple different anchor boxes are set for said each anchor by referring to at least one of (i) at least one scale and (ii) at least one aspect ratio, of at least one of the anchor boxes.

17. The learning device of claim 13, wherein each of the columns includes one or more pixels in the first direction, and each of the rows includes one or more pixels in the second direction.

18. The learning device of claim 13, wherein the at least one first GT includes information on which row each of the bottom lines of each of the nearest obstacles is truly located among the rows, per each of the columns, on condition that the at least one input image is divided into $N_c$ rows, and wherein the at least one obstacle segmentation result represents on which row each of the bottom lines of each of the nearest obstacles is estimated as located among the rows, per each of the columns, on condition that the at least one input image is divided into the $N_c$ rows.

19. The learning device of claim 18, wherein, at the process of (III), if each of the bottom lines of each of the nearest obstacles is estimated as present for each of the columns, the at least one obstacle segmentation result is generated such that each of the estimated positions of the each of the bottom lines in each of the specific rows per each of the columns is allowed to have each corresponding highest value, and positions in other rows among the rows are allowed to have lower values, among the $N_c$ rows.

20. A testing device for testing by using a convolutional neural network (CNN) capable of detecting one or more regions of interest (ROIs) for testing based on one or more bottom lines of one or more nearest obstacles for testing in at least one test image, comprising:
 a communication part for acquiring the at least one test image, on condition that a learning device has performed processes of (1) instructing a first convolutional layer to an n-th convolutional layer to respectively and sequentially generate a first encoded feature map for training to an n-th encoded feature map for training from at least one training image, (2) instructing an n-th deconvolutional layer to a first deconvolutional layer to sequentially generate an n-th decoded feature map for training to a first decoded feature map for training from the n-th encoded feature map for training, (3) if each cell of a grid with a plurality of rows and a plurality of columns is generated by dividing at least one specific decoded feature map for training, among the n-th decoded feature map for training to the first decoded feature map for training, with respect to a first direction and a second direction, wherein the first direction is in a direction of the rows of the at least one specific decoded feature map for training and the second direction is in a direction of the columns thereof, generating at least one obstacle segmentation result for training representing each of specific rows for training, where each of bottom lines of each of one or more nearest obstacles for training is estimated as being located per each of the columns, by referring to at least one feature of at least part of the n-th decoded feature map for training to the first decoded feature map for training, (4) determining each anchor for training as each basis for generating anchor boxes for training to be used for detecting each of one or more ROIs for training, among pixels in each of anchoring rows for training estimated on basis of each of the specific rows for training, per each of the columns. (5) instructing a Region Proposal Network (RPN) to generate (i) at least one ROI bounding box for training by referring to each of the anchor boxes for training wherein at least one of the anchor boxes for training is estimated on basis of said each anchor for training, and (ii) at least one first loss by referring to the at least one ROI bounding box for training and its corresponding at least one first ground truth (GT), wherein the at least one ROI bounding box for training is a specific anchor box for training, having a high probability of being estimated as including a specific object for training, among the anchor boxes for training and wherein the at least one first GT represents a bounding box for training truly including the specific object for training in the at least one training image, and (6) backpropagating the at least one first loss, to thereby learn parameters of the CNN; and
 a processor for performing processes of (1) instructing the first convolutional layer to the n-th convolutional layer to respectively and sequentially generate a first encoded feature map for testing to an n-th encoded feature map for testing from the at least one test image, (II) instructing the n-th deconvolutional layer to the first deconvolutional layer to sequentially generate an n-th decoded feature map for testing to a first decoded feature map for testing from the n-th encoded feature map for testing, (III) if each cell of a grid with a plurality of rows and a plurality of columns is generated by dividing at least one specific decoded feature map for testing, among the n-th decoded feature map for testing to the first decoded feature map for testing, with respect to a first direction and a second direction, wherein the first direction is in a direction of the rows of the at least one specific decoded feature map for testing and the second direction is in a direction of the columns thereof, generating at least one obstacle segmentation result for testing representing each of specific rows for testing, where each of the bottom lines of each of the nearest obstacles for testing is estimated as being located per each of the columns, by referring to at least one feature of at least part of the n-th decoded feature map for testing to the first decoded feature map for testing, (IV) determining each anchor for testing as each basis for generating anchor boxes for testing to be used for detecting each of the one or more ROIs for testing, among pixels in each of anchoring rows for testing estimated on basis of each of the specific rows for testing, per each of the columns, and (V) instructing the RPN to generate at least one ROT bounding box for testing by referring to each of the anchor boxes for testing wherein at least one of the anchor boxes for testing is estimated on basis of said each anchor for testing.

21. The testing device of claim 20, wherein the process of (III) includes processes of:
 (III-1) if each cell of the grid has been generated by dividing the at least one specific decoded feature map for testing with respect to the first direction by first intervals and with respect to the second direction by second intervals, concatenating each of features for testing of each of the rows per each of the columns in a direction of a channel, to thereby generate at least one reshaped feature map for testing; and
 (III-2) generating the at least one obstacle segmentation result for testing which represents where each of the bottom lines of each of the nearest obstacles for testing is estimated as located among the rows for each of the columns by referring to the at least one reshaped feature map for testing via checking each of estimated positions of each of the bottom lines of each of the nearest obstacles for testing on concatenated channels for each of the columns, wherein the at least one obstacle segmentation result for testing is generated by a softmax operation which normalizes each value corresponding to each channel per each of the columns.

22. The testing device of claim 20, wherein, at the process of (V), multiple different anchor boxes for testing are set for said each anchor for testing by referring to at least one of (i) at least one scale and (ii) at least one aspect ratio, of at least one of the anchor boxes for testing.

23. The testing device of claim 20, wherein each of the columns includes one or more pixels in the first direction, and each of the rows includes one or more pixels in the second direction.

24. The testing device of claim 20, wherein the at least one first GT includes information on which row each of the bottom lines of each of the nearest obstacles for testing is truly located among the rows, per each of the columns, on condition that the at least one test image is divided into $N_c$ rows, and wherein the at least one obstacle segmentation result for testing represents on which row each of the bottom lines of each of the nearest obstacles for testing is estimated as located among the rows, per each of the columns, on condition that the at least one test image is divided into the $N_c$ rows, and wherein, at the process of (III), if each of the bottom lines of each of the nearest obstacles for testing is estimated as present for each of the columns, the at least one obstacle segmentation result for testing is generated such that each of the estimated positions of the each of the bottom lines in each of the specific rows for testing per each of the columns is allowed to have each corresponding highest value, and positions in other rows among the rows are allowed to have lower values, among the $N_c$ rows.

\* \* \* \* \*